(12) United States Patent
Marsh et al.

(10) Patent No.: US 11,977,821 B1
(45) Date of Patent: May 7, 2024

(54) OBJECT PROCESSING IN COMPUTER-AIDED DESIGN SYSTEMS AND RELATED METHODS

(71) Applicant: The Canoa Supply Company PBC, Brooklyn, NY (US)

(72) Inventors: Margaret Marsh, Brooklyn, NY (US); Walter Federico Negro, Brooklyn, NY (US); Joshua Emig, Coldspring, NY (US); Nicolas Chaulet, Arlington, MA (US)

(73) Assignee: The Canoa Supply Company PBC, Brooklyn, NY (US)

( * ) Notice: Subject to any disclaimer, the term of this patent is extended or adjusted under 35 U.S.C. 154(b) by 0 days.

(21) Appl. No.: 18/389,079

(22) Filed: Nov. 13, 2023

Related U.S. Application Data

(60) Provisional application No. 63/545,672, filed on Oct. 25, 2023, provisional application No. 63/470,661, filed on Jun. 2, 2023.

(51) Int. Cl.
   *G06F 30/12* (2020.01)
   *G06F 30/13* (2020.01)
   (Continued)

(52) U.S. Cl.
   CPC .............. *G06F 30/12* (2020.01); *G06F 30/13* (2020.01); *G06F 30/27* (2020.01); *G06F 2111/16* (2020.01); *G06F 2111/18* (2020.01)

(58) Field of Classification Search
   CPC .......... G06F 30/00; G06F 30/12; G06F 30/13; G06F 30/27; G06F 2111/16; G06F 2111/18
   (Continued)

(56) References Cited

U.S. PATENT DOCUMENTS

| | | |
|---|---|---|
| 7,529,773 B2 | 5/2009 | Rogers |
| 10,606,963 B2 | 3/2020 | Tiwari et al. |

(Continued)

OTHER PUBLICATIONS

Para, Wamiq Reyaz et al., "COFS: Controllable Furniture Layout Synthesis", May 29, 2022. (Year: 2022).*

(Continued)

*Primary Examiner* — Cedric Johnson
(74) *Attorney, Agent, or Firm* — Brient IP Law, LLC

(57) ABSTRACT

In the context of a computer-aided design platform providing a user-specific set of acquirable objects, a CAD design and object acquisition computing system is configured for accessing a set of object properties for a particular object; analyzing object selection data indicating a set of currently placed within the CAD environment, analyzing related design data comprising a set of design data for a set of other virtual environments, wherein at least a portion of the other virtual environments in the set of other virtual environments include the particular object; accessing an object design ruleset defining one or more selection limitations; processing the set of object properties, the object selection data, the related design data, and the object design ruleset using at least one of a rules-based model or a machine-learning model to generate an object recommendation; and modifying a graphical user interface to include an indication of the object recommendation.

20 Claims, 25 Drawing Sheets

(51) Int. Cl.
*G06F 30/27* (2020.01)
*G06F 111/16* (2020.01)
*G06F 111/18* (2020.01)

(58) Field of Classification Search
USPC .............................................................. 703/1
See application file for complete search history.

(56) References Cited

U.S. PATENT DOCUMENTS

| | | | |
|---|---|---|---|
| 10,956,626 B2 | 3/2021 | Yang et al. | |
| 10,997,325 B2* | 5/2021 | Austern | G06V 10/235 |
| 11,263,358 B2 | 3/2022 | Hoppe et al. | |
| 2004/0113945 A1* | 6/2004 | Park | G06F 30/13 |
| | | | 715/765 |
| 2015/0324940 A1* | 11/2015 | Samson | G06Q 10/06313 |
| | | | 705/7.23 |
| 2021/0209261 A1 | 7/2021 | Reynolds et al. | |
| 2023/0061250 A1* | 3/2023 | Liu | G06N 3/0475 |

OTHER PUBLICATIONS

Merrell, Paul et al. "Interactive Furniture Layout Using Interior Design Guidelines", Jul. 2011, ACM Transactions on Graphics, vol. 30, No. 4, Article 87. (Year: 2011).*

Office Action, dated Feb. 7, 2024, from corresponding U.S. Appl. No. 18/389,074.

Liu, Wei, et al. "Towards ubiquitous data access service of 30 part library in cloud scheme with host independence." The International Journal of Advanced Manufacturing Technology 120.9-10 (2022): 5777-5791.

Theret, Jean-pierre, et al. "Integrating CAD, PLM and LCA: new concepts, data model, architecture & integration proposals." EnviroInfo. 2011.

* cited by examiner

FIG. 7

OBJECT PROCESSING IN COMPUTER-AIDED DESIGN SYSTEMS AND RELATED METHODS

CROSS-REFERENCE TO RELATED APPLICATION

This application claims the benefit of U.S. Provisional Patent Application No. 63/470,661 filed, Jun. 2, 2023 and U.S. Provisional Patent Application No. 63/545,672, filed Oct. 25, 2023, which are hereby incorporated by reference in their entirety for all purposes.

TECHNICAL FIELD

The present disclosure relates generally to data processing systems for processing object properties using at least one of a rules based model or a machine learning model to generate object recommendations in the context of computer-aided design systems.

BACKGROUND

A significant technical challenge encountered in the context of providing efficient functioning of a computer is generating and configuring computer-aided design (CAD) platforms for electronic devices that improve the efficiency of use of the electronic devices for a user. Existing computer-aided design platforms provide generic environments, objects, and design tools that limit a user's access to data or functionality. Additionally, where computer-aided design objects represent physical objects from a variety of sources, it can be technically challenging to facilitate network communications with the proper third party computing systems that are associated with each physical object used in a particular computer-aided design project. Accordingly, there is a need for improved CAD systems that enable more efficient use of electronic devices.

SUMMARY

In general, various aspects of the present invention provide methods, apparatuses, systems, computing devices, computing entities, and/or the like for manipulating a user-specific set of objects in a computer-aided design environment, particularly when the set of objects are defined by objects that are specifically acquirable by the user utilizing the platform. In accordance with one aspect, a method is provided. According to particular aspects, the method comprises: (1) generating, by computing hardware, a graphical user interface comprising a virtual environment; (2) providing, by the computing hardware, the graphical user interface for display on a computing device; (3) accessing, by the computing hardware, user data for a user of the computing device; (4) generating, by the computing hardware based on the user data, a user-specific customized set of objects by: (A) interfacing with a plurality of third party computing systems to identify a first set of acquirable objects, each object in the first set of acquirable objects being available via a respective third party computing system of the plurality of third party computing systems; (B) identifying a second set of available objects based on the user data, the second set of available objects corresponding to a set of objects that are currently available to the user; and (C) generating the user-specific customized set of objects to include at least the first set of acquirable objects and the second set of acquirable objects; (5) providing, by the computing hardware, the user-specific customized set of objects for placement and positioning within the virtual environment; (6) receiving, by the computing hardware from the user via the computing device, selection of a subset of the user-specific customized set of objects for placement and positioning within the virtual environment; (7) modifying, by the computing hardware, the virtual environment to include each respective object from the user-specific customized set of objects such that each respective object is placed and positioned based on input from the user; (8) receiving, by the computing hardware, an acquisition request for the subset of the user-specific customized set of objects; (9) identifying, by the computing hardware, for each respective object from the subset of user-specific customized set of objects, at least one of: (A) the respective third party computing system; or (B) logistical operations specific to the respective object; and (10) responsive to the acquisition request, performing, by the computing hardware for each respective object from the subset of user-specific customized set of objects, at least one of: (A) initiating network communication with the respective third party computing system; or (B) initiating the logistical operations specific to the respective object.

In some aspects, identifying the second set of available objects based on the user data comprises: (A) accessing, by the computing hardware using the user data, an organization object inventory to identify an organization-specific set of objects; and (B) identifying, from the organization-specific set of objects by the computing hardware, the set of objects that are currently available to the user. In some aspects, the method further comprises, responsive to the acquisition request: (1) assigning, by the computing hardware, a first respective unique identifier to each first respective object of the subset of the user-specific customized set of objects that is in the first set of acquirable objects; (2) storing, by the computing hardware, metadata associating each respective first unique identifier with each first respective object and a location represented by the virtual environment; (3) modifying, by the computing hardware, the organization object inventory to include each respective first unique identifier and the first metadata; (4) identifying, by the computing hardware, in the organization object inventory, an existing respective unique identifier for each second respective object of the subset of the user-specific customized set of objects that is in the second set of available objects; and 5) modifying, by the computing hardware, second metadata associated with each existing respective unique identifier to include the location.

In particular aspects, the method further comprises: (1) accessing, by the computing hardware, for each respective object from the subset of user-specific customized set of objects: (A) respective object characteristic data; (B) respective object lifecycle data; and (C) respective object transportation data; (2) processing, by the computing hardware, the respective object characteristic data, the respective object lifecycle data, and the respective object transportation data using at least one of a machine learning model or a rules-based model to generate respective object impact data for each respective object from the subset of user-specific customized set of objects; (4) determining, by the computing hardware based on the respective object impact data, an impact value for the subset of user-specific customized set of objects; and (5) modifying, by the computing hardware, the graphical user interface to include an indication of the object impact value.

In various aspects, the method further comprises: (1) receiving, by the computing hardware, selection of two or more objects from the subset of user-specific customized set of objects; (2) receiving, by the computing hardware, a request to generate an object kit comprising the two or more objects; (3) responsive to receiving the request to generate the object kit comprising the two or more objects, generating, by the computing hardware, the object kit by: (A) generating the object kit; (B) associating the two or more objects with the object kit; (C) determining relative orientation and positioning data for the two or more objects in the virtual environment; (D) storing the orientation and positioning data in computer memory; (E) associating the orientation and positioning data with the object kit; and (F) modifying the user-specific customized set of objects to include the object kit. In still other aspects, the method comprises providing, by the computing hardware, the object kit in a second user-specific customized set of objects for a second user.

In various aspects, the method comprises: (1) receiving, by the computing hardware, image data for a new object; (2) processing, by the computing hardware, the image data using a classification model to determine a classification for the new object; (4) generating, by the computing hardware, a representation of the new object for use in the virtual environment; and (5) modifying, by the computing hardware, the user-specific customized set of objects to include the new object.

In accordance with another aspect, a system comprising a non-transitory computer-readable medium storing instructions and a processing device communicatively coupled to the non-transitory computer-readable medium. Accordingly, the processing device is configured to execute the instructions and thereby perform operations comprising: (1) generating a graphical user interface comprising an environment layout; (2) accessing, for a particular user, a set of available objects for use in the environment layout; (3) providing the graphical user interface for a computing device of the particular user; 4) receiving a selection of at least a first portion of the set of available objects; (5) modifying the environment layout to include the first portion of the set of available objects based on user input on the computing device; (6) receiving a request to initiate acquisition of the first portion of the set of available objects; (7) identifying a set of respective sources for the first portion of the set of available objects; and (8) in response to the request, initiating network communication with or processing operations on a plurality of third party computing systems to facilitate the acquisition, each of the plurality of third party computing systems being associated with a respective source of the set of respective sources.

In some aspects, the operations further comprise generating a listing of the set of available objects by: (A) interfacing with the plurality of the third party computing systems to identify a set of acquirable objects; (B) accessing an object inventory for an organization associated with the user to identify a set of potentially available objects; and (C) populating the listing of the set of available objects with the set of acquirable objects and the set of potentially available objects. In particular aspects, the set of available objects comprises a first object kit comprising two or more objects from the set of available objects and defining a spatial relationship between the two or more objects; and the operations further comprise: (A) receiving selection of the first object kit; (B) responsive to the selection of the first object kit, modifying the environment layout to include the two or more objects such that each of the two or more objects are positioned relative to each other based on the spatial relationships.

In some embodiments, the operations further comprise: (1) receiving, via the computing device: (A) spatial data for the environmental layout; and (B) space usage data; (3) processing the spatial data and the space usage data using at least one of a rules-based model or a machine-learning model to generate an object layout for the first portion of the set of available objects; and (4) modifying a respective position of each object in the first portion of the set of available objects within the environment layout according to the object layout. In some aspects, generating the graphical user interrace comprising the environment layout comprises receiving a floorplan schematic and generating the environment layout based on the floorplan schematic. In various aspects, the operations further comprise: (1) receiving new object data for a new object; (2) determining object properties for the new object based on the new object data; (3) generating a representation of the new object for use in the environment layout; and (4) modifying the set of available objects to include the new object.

In accordance with yet another aspect, a non-transitory computer-readable medium is provided. The non-transitory computer-readable medium having program code that is stored thereon, the program code executable by one or more processing devices for performing operations comprising: (1) generating a graphical user interface comprising a virtual environment; (2) providing the graphical user interface for display on a computing device; (3) generating a user-specific customized set of objects by interfacing with a plurality of third party computing systems to identify a set of acquirable objects, each object in the set of acquirable objects being available via a respective third party computing system of the plurality of third party computing systems; (4) providing the user-specific customized set of objects for placement and positioning within the virtual environment; (5) receiving from a user via the computing device, selection of a subset of the user-specific customized set of objects for placement and positioning within the virtual environment; (6) modifying the virtual environment to include each respective object from the user-specific customized set of objects such that each respective object is placed and positioned based on input from the user; (7) receiving an acquisition request for the subset of the user-specific customized set of objects; (8) identifying, for each respective object from the subset of user-specific customized set of object, the respective third party computing system; and (9) responsive to the acquisition request, facilitating communication with each respective third party computing system.

In some aspects, the operations further comprise: (1) receiving planning data; (2) determining object preference data; (3) identifying the subset of the user-specific customized set of objects based on the object preference data and the planning data; and (4) providing the subset of the user-specific customized set of objects for selection on the graphical user interface. In some aspects, the operations comprise automatically populating the virtual environment with the subset of the user-specific customized set of objects by: (1) processing the subset of the user-specific customized set of objects using at least one of a rules-based model or a machine-learning model to determine a position and orientation of each object in the subset of the user-specific customized set of objects; and (2) placing each object in the subset of the user-specific customized set of objects in the virtual environment according to the determined position and orientation. In other aspects, the operations comprise: (1) accessing for a particular object from the subset of user-specific customized set of objects: (A) object characteristic data; and (B) object lifecycle data; (2) processing the object characteristic data and the object lifecycle data using at least one of a machine learning model or a rules-based model to generate object impact data for the particular object; (3) determining, based on the object impact data, an impact value for the particular object; and (4) modifying the graphical user interface to include an indication of the impact value. In still other aspects, the operations further comprise, responsive to the acquisition request: (1) assigning a respective unique identifier to each respective object of the subset of the user-specific customized set of objects; (2) storing metadata associating each respective unique identifier with each respective object and a location represented by the virtual environment; and (3) modifying an organization object inventory associated with the user to include each respective unique identifier and the metadata.

In some aspects, the operations further comprise: (1) generating a sharable version of the virtual environment; and (2) providing access to the sharable version of the virtual environment to at least one second user. In various aspects, providing access to the sharable version of the virtual environment to the at least one second user comprises enabling each of the user and the at least one second user to simultaneously edit the virtual environment form respective computing devices.

In accordance with various aspects, a method is provided. According to particular aspects, the method comprises: (1) generating, by computing hardware, a graphical user interface comprising a virtual environment; (2) providing, by the computing hardware, the graphical user interface for display on a computing device; (3) accessing, by the computing hardware, user data for a user of the computing device; (4) generating, by the computing hardware based on the user data, a user-specific customized set of objects by: (A) interfacing with a plurality of the third party computing systems to identify a first set of acquirable objects, each object in the first set of acquirable objects being available via a respective third party computing system of the plurality of third party computing systems; (B) identifying a second set of available objects based on the user data, the second set of available objects corresponding to a set of objects that are currently available to the user; and (C) generating the user-specific customized set of objects to include at least the first set of acquirable objects and the second set of acquirable objects; (5) providing, by the computing hardware, the user-specific customized set of objects for placement and positioning within the virtual environment; (6) receiving, by the computing hardware, a selection of a particular object in the user-specific customized set of objects; (7) responsive to receiving the selection of the particular object: (A) accessing a set of object properties for the particular object; (B) analyzing object selection data, the object selection data indicating a set of currently placed objects from the user-specific customized set of objects that are currently placed within the virtual environment; (C) analyzing related design data, the related design data comprising a set of design data for a set of other virtual environments, wherein at least a portion of the other virtual environments in the set of other virtual environments include the particular object; (D) accessing an object design ruleset, the object design ruleset defining one or more selection limitations; (E) processing the set of object properties, the object selection data, the related design data, and the object design ruleset using at least one of a rules-based model or a machine-learning model to generate an object recommendation; and (F) modifying, by the computing hardware, the graphical user interface to include an indication of the object recommendation.

In some aspects, the object recommendation comprises at least one of: (1) a first recommendation for a replacement object to replace the particular object; or (2) a second recommendation for a complimentary object for placement in proximity with the particular object. In various aspects, the set of object properties comprise at least one of: (1) an object type of the particular object; (2) an object size of the particular object; (3) an object color of the particular object; (4) an object condition of the particular object; or (5) a set of object features for the particular object. In various aspects, the object design ruleset defines at least one of: (1) one or more object impact rules; (2) one or more object cost rules; (3) one or more object rating rules; (4) one or more object relational rules; or (5) one or more shared property limitation rules.

In particular aspects, processing the set of object properties, the object selection data, the related design data, and the object design ruleset using the at least one of the rules-based model or the machine-learning model to generate the object recommendation comprises processing the set of object properties, the object selection data, the related design data, and the object design ruleset using the rules-based model to generate the object recommendation such that the rules-based models assigns a weighting to each rule in the object design ruleset such that the object recommendation violates at least one rule in the object design ruleset.

In some aspects, the method further comprises: (1) accessing, by the computing hardware for the particular object: (A) object characteristic data; and (B) object lifecycle data; (2) processing the object characteristic data and the object lifecycle data using at least one of a machine learning model or a rules-based model to generate object impact data for the particular object; (3) determining, based on the object impact data, an impact value for the particular object; and (4) modifying the graphical user interface to include an indication of the impact value. In other aspects, the method comprise: (1) receiving, by the computing hardware, an acquisition request for the subset of the user-specific customized set of objects; (2) identifying, by the computing hardware, for each respective object from the subset of user-specific customized set of objects, at least one of: (A) the respective third party computing system; or (B) logistical operations specific to the respective object; and (3) responsive to the acquisition request, performing, by the computing hardware for each respective object from the subset of user-specific customized set of objects, at least one of: (A) initiating network communication with the respective third party computing system; or (B) initiating the logistical operations specific to the respective object.

A non-transitory computer-readable medium has program code that is stored thereon. In some aspects, the program code is executable by one or more processing devices for performing operations comprising: (1) generating a graphical user interface comprising a virtual environment; (2) providing the graphical user interface for display on a computing device; (3) generating a user-specific customized set of objects by interfacing with a plurality of third party computing systems to identify a set of acquirable objects, each object in the set of acquirable objects being available via a respective third party computing system of the plurality of third party computing systems; (4) providing the user-specific customized set of objects for placement and positioning within the virtual environment; (5) receiving from a user via the computing device, selection of a subset of the user-specific customized set of objects for placement and positioning within the virtual environment; (6) modifying the virtual environment to include each respective object from the user-specific customized set of objects such that each respective object is placed and positioned based on input from the user; (7) receiving a selection of a particular object in the user-specific customized set of objects; (8) responsive to receiving the selection of the particular object: (A) accessing a set of object properties for the particular object; (B) analyzing object selection data, the object selection data indicating a set of currently placed objects from the user-specific customized set of objects that are currently placed within the virtual environment; (C) processing the set of object properties and the object selection data using at least one of a rules-based model or a machine-learning model to generate an object recommendation; and (D) modifying, by the computing hardware, the graphical user interface to include an indication of the object recommendation.

In some aspects, the set of object properties comprise at least one of: (1) an object type of the particular object; (2) an object size of the particular object; (3) an object color of the particular object; (4) an object condition of the particular object; or (5) a set of object features for the particular object. In particular aspects, processing the set of object properties and the object selection data using the at least one of the rules-based model or the machine-learning model to generate the object recommendation comprises processing the set of object properties and the object selection data using the at least one of the rules-based model or the machine-learning model to generate an object recommendation from the user-specific customized set of objects.

In various aspects, the object recommendation comprises a complete object set recommendation for each respective object in the subset of the user-specific customized set of objects for placement and positioning within the virtual environment. In some aspects, the operations further comprise: (1) receiving space planning data; (2) determining object preference data; and (3) processing the set of object properties, the object selection, the space planning data, and the object preference data using at least one of a rules-based model or a machine-learning model to generate the complete object set recommendation. In particular embodiments, the operations further comprise automatically populating the virtual environment with the subset of the user-specific customized set of objects provided by the complete object set recommendation by: (1) processing the subset of the user-specific customized set of objects provided by the complete object set recommendation using at least one of a rules-based model or a machine-learning model to determine a position and orientation of each object in the subset of the user-specific customized set of objects; and (2) placing each object in the subset of the user-specific customized set of objects in the virtual environment according to the determined position and orientation.

In some aspects, the particular object is in the subset of the user-specific customized set of objects; and the operations further comprise: (1) receiving a request to replace the particular object with a replacement object according to the object recommendation; and (2) responsive to the request, modifying the subset of the user-specific customized set of objects to include the replacement object and exclude the particular object.

In other aspects, the operations further comprise: (1) receiving an acquisition request for the subset of the user-specific customized set of objects; (2) identifying, for each respective object from the subset of user-specific customized set of object, the respective third party computing system; and (3) responsive to the acquisition request, facilitating communication with each respective third party computing system.

In accordance with another aspect, a system comprising a non-transitory computer-readable medium storing instructions and a processing device communicatively coupled to the non-transitory computer-readable medium. Accordingly, the processing device is configured to execute the instructions and thereby perform operations comprising: (1) generating a graphical user interface comprising an environment layout; (2) accessing, for a particular user, a set of available objects for use in the environment layout; (3) providing the graphical user interface for a computing device of the particular user; (4) providing, via the graphical user interface, the set of available objects for placement in the environment layout; (5) receiving a selection of a particular object in the set of available objects; (6) responsive to receiving the selection of the particular object: (A) accessing a set of object properties for the particular object; (B) analyzing object selection data, the object selection data indicating a set of currently placed objects from set of available objects that are currently placed within the virtual environment; (C) analyzing related design data, the related design data comprising a set of design data for a set of other virtual environments, wherein at least a portion of the other virtual environments in the set of other virtual environments include the particular object; (E) accessing an object design ruleset, the object design ruleset defining one or more selection limitations; (F) processing the set of object properties, the object selection data, the related design data, and the object design ruleset using at least one of a rules-based model or a machine-learning model to generate an object recommendation; and (G) modifying, by the computing hardware, the graphical user interface to include an indication of the object recommendation.

In some aspects, the set of object properties comprise at least one of: an object type of the particular object; an object size of the particular object; an object color of the particular object; or an object feature of the particular object. In various aspects, the object design ruleset defines at least one of: one or more object impact rules; one or more object cost rules; or one or more object rating rules.

In some aspects, the object recommendation comprises a set of potential replacement objects for the particular object. In such aspects, the operations may further comprise: (A) accessing, for each potential replacement object in the set of potential replacement objects: (1) respective object characteristic data; and (2) respective object lifecycle data; (B) processing the respective object characteristic data and the respective object lifecycle data using at least one of a machine learning model or a rules-based model to generate respective object impact data for each potential replacement object; (C) determining, based on the respective object impact data, a respective impact value for each potential replacement object; and (D) modifying the graphical user interface to include an indication of the respective impact value in association with each potential replacement object in the set of potential replacement objects.

In some aspects, the object recommendation comprises a set of potential replacement objects for the particular object. In various embodiments, the set of object properties comprise at least three of: an object type of the particular object; an object size of the particular object; an object color of the particular object; or an object feature of the particular object. In particular objects, the object design ruleset defines a requirement that each potential replacement object in the set of potential replacement objects share at least three object properties with the particular object.

In a particular embodiments, the operations comprise: (1) receiving, within the virtual environment, image data for a new object; (2) processing, by the computing hardware, the image data using a classification model to determine a classification for the new object; and (3) processing the classification for the new object using at least one of a rules-based model or a machine-learning model to generate a second object recommendation for the new object from the set of available objects. In other aspects, the operations further comprise: (1) receiving a request to initiate acquisition of the first portion of the set of available objects; (2) identifying a set of respective sources for the first portion of the set of available objects; and (3) in response to the request, initiating network communication with or processing operations on a plurality of third party computing systems to facilitate the acquisition, each of the plurality of third party computing systems being associated with a respective source of the set of respective sources.

BRIEF DESCRIPTION OF THE DRAWINGS

In the course of this description, reference will be made to the accompanying drawings, which are not necessarily drawn to scale, and wherein:

FIG. 7 depicts an example of a CAD platform in accordance with various aspects of the present disclosure;

DETAILED DESCRIPTION

Overview

Figure 1:
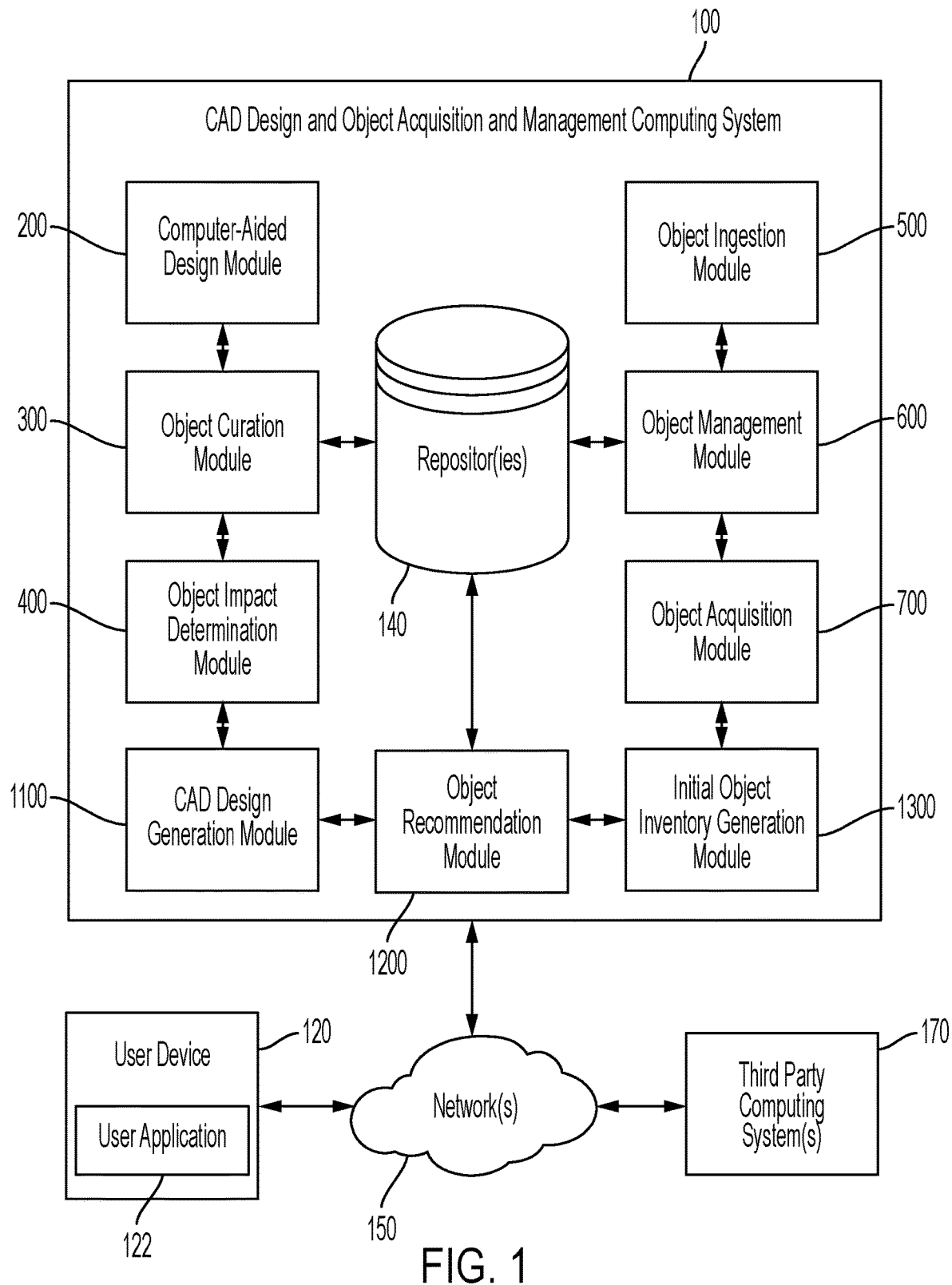
FIG. 1 depicts an example of a computing environment that can be used for providing computer aided design platforms and object acquisition and management systems related to computer aided designs produced via such platforms according to various aspects.

As noted, a significant technical challenge encountered in the context of providing efficient functioning of a computer is generating and configuring computer-aided design (CAD) platforms for electronic devices that improve the efficiency of use of the electronic devices for a user. For example, in the context of CAD platforms, the CAD platform may provide design functionality such as sketching or outlining a layout of a set of physical objects within a virtual environment that corresponds to a real-world physical environment. As such, various aspects of the CAD system configure the CAD platform such that each object available in the context of the design environment is accessible to and/or acquirable by a user of the CAD platform as a real-world counterpart. Maintaining an accurate listing of available objects can be particularly technically challenging when, for example, each set of available objects may differ for each user of the CAD platform. Each user may, for example, have access to particular objects from a plurality of different sources and those objects may differ from user to user. In this way, it can present a technical challenge in the context of a CAD platform to provide an accurate, up-to-date set of available objects to each user of the platform.

Additionally, each object may have a particular size or other configuration such that placement of the object within the CAD design environment must be accurate in terms of potential interaction with the environment and other objects within it. As such, a significant technical challenge in the context of CAD platforms that correspond to real-world counterparts is accessing accurate CAD representations of each potential available object that are accurate in terms of appearance and size to the actual corresponding objects.

Another significant technical challenge in the context of a CAD platform is providing a system to enable a user to acquire each object utilized in a particular design. In various aspects, each particular object used in designing the layout of a set of physical objects within a virtual environment that corresponds to a real-world physical environment may be available from a different source. In some aspects, the logistics of acquiring each object for placement in the real-world physical environment may require communication with a plurality of third-party computing systems as well as initiation of logistics operation to relocate each object to a desired location defined by a CAD design. In various aspects, each object utilized in the context of a particular design generated the CAD system may have a different set of acquisition instructions. As such, the CAD system may, for each object, need to identify and execute a unique set of instructions in order to facilitate the acquisition.

In some aspects, a CAD design and object acquisition and management computing system provides a user-specific customized set of objects for use in a CAD design environment. The CAD design and object acquisition and management computing system further enables the user to initiate necessary network communications and logistics operations to acquire each object utilized in the context of a particular CAD design from a single interface. In various aspects, the CAD design and object acquisition and management computing system facilitates object specific computing operations for each object utilized in a particular design.

As such, various embodiments of a CAD platform described herein provide improvements to graphical user interface generation by including a specific structure in a generated user interface that provides a specific function derived from that specific structure. For example, a generated user interface could include a set of available objects for use on a computer-aided design platform. In various aspects, the graphical user interface provides specifically structured objects for placement within a virtual environment (e.g., virtual floorplan) such that the structure of each object corresponds to a real-world relative size, shape and configuration of the object. As such, various aspects described herein are directed to a specific improved method for manipulating a user-specific set of objects in a computer-aided design environment, particularly when the set of objects are defined by objects that are specifically acquirable by the user utilizing the platform.

As described herein, certain aspects further provide improvements in graphics processing by automatically applying various rules of a particular type, such as to determine object impact data and classify objects for use in the system, to control the manner in which computing devices dynamically generate the object impact data and perform certain classification steps for new objects for use in the system. Additionally, certain aspects automatically apply customized configurations to sets of objects when adding a set of objects to the design environment. These rules can define arrangements of related objects automatically, without user input or positioning. This process reduces or eliminates the need to rely on user inputs (e.g., selecting each object in a set individually, placing each object relative to other objects manually, etc.) to manually position particular objects and place the objects in a specific arrangement within the design environment. The automated application of these rules are facilitated by and specifically improve user interface generation for accessing functionality in a computer-aided design platform via user interfaces. By contrast, conventional techniques for manipulating objects within a graphical design context require subjective determinations applied to imprecise manual operations, such as manually positioning each object in a design environment relative to other objects, manually selecting and inserting each appropriate object, manually navigating to each particular object from a set of available objects, repeating the process for each desired object in a set, etc. Thus, aspects described herein improve computer-implemented processes that are unique to generating user interfaces and improving the usability of user interfaces in a computer-aided design context, thereby providing a more suitable solution for automating tasks previously performed by humans.

Furthermore, certain aspects provide improvements to computing systems used for enabling a user to acquire each object utilized in a particular design by, for example, reducing cumbersome or time-consuming processes for acquiring each individual item from a plurality of different sources. Additional or alternative aspects reduce cumbersome, time-consuming processes for identifying each object source, navigating to different platforms for initiation of acquisition of each object from third party computing systems, initiating the acquisition of logistics operations for acquiring each item, identifying and initiating the object-specific computing operations required to acquire the object, etc. Such cumbersome processes require the use of arbitrary commands to access each third party system in order to individually facilitate acquisition of each item utilized in a particular design. (e.g., copy pasting links for different locations, navigating to a particular web page that includes each desired object, entering information into the web page in order to facilitate acquisition of the object, repeating these steps for each desired item or set of items, etc.). These problems can be addressed by various user interface features described herein. For instance, a client application can include control elements with functionalities that facilitate the network communication and logistics operations required to complete acquisition of each object utilized in a particular design automatically from a single interface. Various aspects may provide such control elements within a single accessible interface from the design environment. Thus, the structure and associated functionality of the interface features described herein can provide improvements in the field of user interface generation and display in addition to improvements in network communications.

In still other aspects, a CAD design and object acquisition and management computing system provide improved object recommendations for use in a CAD environment (e.g., including recommendations as to replacement objects and coordinating objects for a selected object) that a specific to a particular organization/user to a first party computing system by generating timing predictions for integration of the third party computing functional. The system may, for example: (1) take into account related designs when making design recommendations; (2) analyze designs for other entities that have used a particular object in a different design when making a recommendation; (3) take into account design rules and requirements for a particular organization when recommending objects for use in a design; (4) etc. In this way, the system provides specifically tailored object recommendations (e.g., for either replacing or coordinating with a selected object or set of objects) that are specifically tailored to the unique characteristics of a particular virtual environment, user, and/or organization. These improved recommendations eliminate the inherent generic results of conventional recommendation request by using additional design data and requirements to enhance recommendations such that the recommendations are specific to and more relevant to a particular organization in a particular situation.

Example Computing Environment

FIG. 1 depicts an example of a computing environment that can be used for providing computer aided design platforms and object acquisition and management systems related to computer aided designs produced via such platforms. For example, users may be interested in computer-aided design (CAD) platforms that provide a customized set of objects for use in the computer-aided design, while also providing a centralized platform for acquiring a real-world version of each object used in a particular design regardless of a source of the object.

In various aspects, a CAD design and object acquisition and management computing system 100 is provided within the computing environment that includes software components and/or hardware components to aid users in sketching or outlining a layout of a set of physical objects within a virtual environment while enabling those users to acquire each object used in a particular design through communication with third party computing systems 170. For instance, the CAD design and object acquisition and management computing system may provide a CAD platform or other service that is accessible over one or more networks 150

(e.g., the Internet) by a user accessing a user application 122 on a user computing device 120.

Here, the CAD design and object acquisition and management computing system 100 may provide the user computing device 120 with one or more graphical user interfaces (e.g., webpages) through the service to access the CAD design and object acquisition and management computing system 100. The user may use the service in performing functionality associated with organizing and designing objects within a virtual environment and acquiring each object utilized in the design that are separately acquirable via multiple third party computing systems 170. For example, the CAD design and object acquisition and management computing system 100 computing system 100 may provide customized instances of a CAD platform for each user that are customized in terms of objects available for use on the platform based on objects actually available to (or acquirable by) the user for use in a real world location that corresponds to the designed environment. In this way, the CAD design and object acquisition and management computing system 100 may provide graphical user interfaces and design tools that are more useful to each individual user and that also facilitate the actual acquisition of each object in a more streamlined manner than conventional systems.

In addition to the graphical user interfaces, the CAD design and object acquisition and management computing system 100 may include one or more interfaces (e.g., application programming interfaces (APIs)) for communicating and/or accessing the third party computing system(s) 170 over the network(s) 150. For instance, the CAD design and object acquisition and management computing system 100 computing system 100 may access a third party computing system 170 via one of the interfaces to initiate logistics operations for transferring a particular object to the corresponding real-world location for a particular design made by the user on the CAD platform.

In some instances, the CAD design and object acquisition and management computing system 100 may include one or more repositories 140 that can be used for storing data related to each available object for a particular user or set of users. In other aspects, the one or more repositories 140 may store data related to an impact of particular objects in a particular set of objects, or other suitable data.

In some aspects, the CAD design and object acquisition and management computing system 100 executes a Computer-Aided Design Module 200 to provide computer-aided design functionality to a user with a user-specific set of design objects. The computer-Aided Design Module 200 may be configured to generate a virtual environment that corresponds to a real-world location and/or space and provide a set of objects for populating the virtual environment.

In some aspects, the CAD design and object acquisition and management computing system 100 executes an object curation module 300 for providing a customized group of design objects in accordance with various aspects of the present disclosure. The object curation module 300 may be configured to provide a curated set of objects for insertion and use in a CAD environment. In various aspects, the curated set of objects include relational definitions that define the visual relationship of each object in the curated set when placed in the CAD environment.

In additional or alternative aspects, the CAD design and object acquisition and management computing system 100 executes an object impact determination module 400 for determining impact data for a particular object. The object impact determination module 400 may, for example, modify user interfaces to include an indication of the impact data for the particular object (e.g., when displayed in the context of the CAD platform described herein).

In additional or alternative aspects, the CAD design and object acquisition and management computing system 100 executes an object ingestion module 500 for adding new objects for use on a CAD platform (e.g., and/or in the context of a CAD platform that is integrated with a system for initiating networked communication with one or more third party computing systems identified by objects used in a particular CAD design.

In additional or alternative aspects, the CAD design and object acquisition and management computing system 100 executes an object management module 600 for managing a set of objects on an organization level. In some aspects, the set of objects may include a set of objects defined by each CAD design implemented by a particular organization.

In additional or alternative aspects, the CAD design and object acquisition and management computing system 100 executes an object acquisition module 700 for initiating network communication with third party computing systems associated with particular objects utilized on a CAD platform. In some aspects, the object acquisition module 700 initiates logistics operations for transporting objects between locations, etc.

In additional or alternative aspects, the CAD design and object acquisition and management computing system 100 executes a CAD Design Generation Module 1100 for automatically generating a CAD design for a particular space based on planning data, available objects, object preferences, etc. In some aspects, the system may generate the CAD design to include a particular set of objects in a particular arrangement within the CAD platform.

In additional or alternative aspects, the CAD design and object acquisition and management computing system 100 executes an object recommendation module 1200 for generating an organization and space specific recommendation for particular objects. The recommendation may, for example, be based on prior object selection, object ratings, design rules, or other suitable factors. In some aspects, the object recommendation module 1200 generates a recommendation for a single object in a particular scenario. In other aspects, the object recommendation module 1200 generates a recommendation for a set of related objects.

In additional or alternative aspects, the CAD design and object acquisition and management computing system 100 executes an initial object inventory generation module 1300 for generating an object inventory for a particular organization (e.g., or a particular location) based on objects identified from imaging data. In some aspects, the initial object inventory generation module 1300 may generate an initial inventory that includes a number, type, and condition of each object within a particular space that corresponds to a design space on a CAD platform.

Further detail is provided below regarding the configuration and functionality of the CAD module 200, object curation module 300, object impact determination module 400, object ingestion module 500, object management module 600, object acquisition module 700, CAD Design Generation Module 1100, object recommendation module 1200, and initial object inventory generation module 1300, according to various aspects of the disclosure.

The number of devices depicted in FIG. 1 are provided for illustrative purposes. In some aspects, different number of devices may be used. In various aspects, for example, while certain devices or systems are shown as single devices in FIG. 1, multiple devices may instead be used to implement these devices or systems.

In some aspects, the CAD design and object acquisition and management computing system 100 can include one or more third-party devices such as, for example, one or more servers operating in a distributed manner. The CAD design and object acquisition and management computing system 100 can include any computing device or group of computing devices, and/or one or more server devices Although the data repository 140 is shown as a single component, these components 140 may include, in other aspects, a single server and/or repository, servers and/or repositories, one or more cloud-based servers and/or repositories, or any other suitable configuration.

Computer-Aided Design Module

Figure 2:
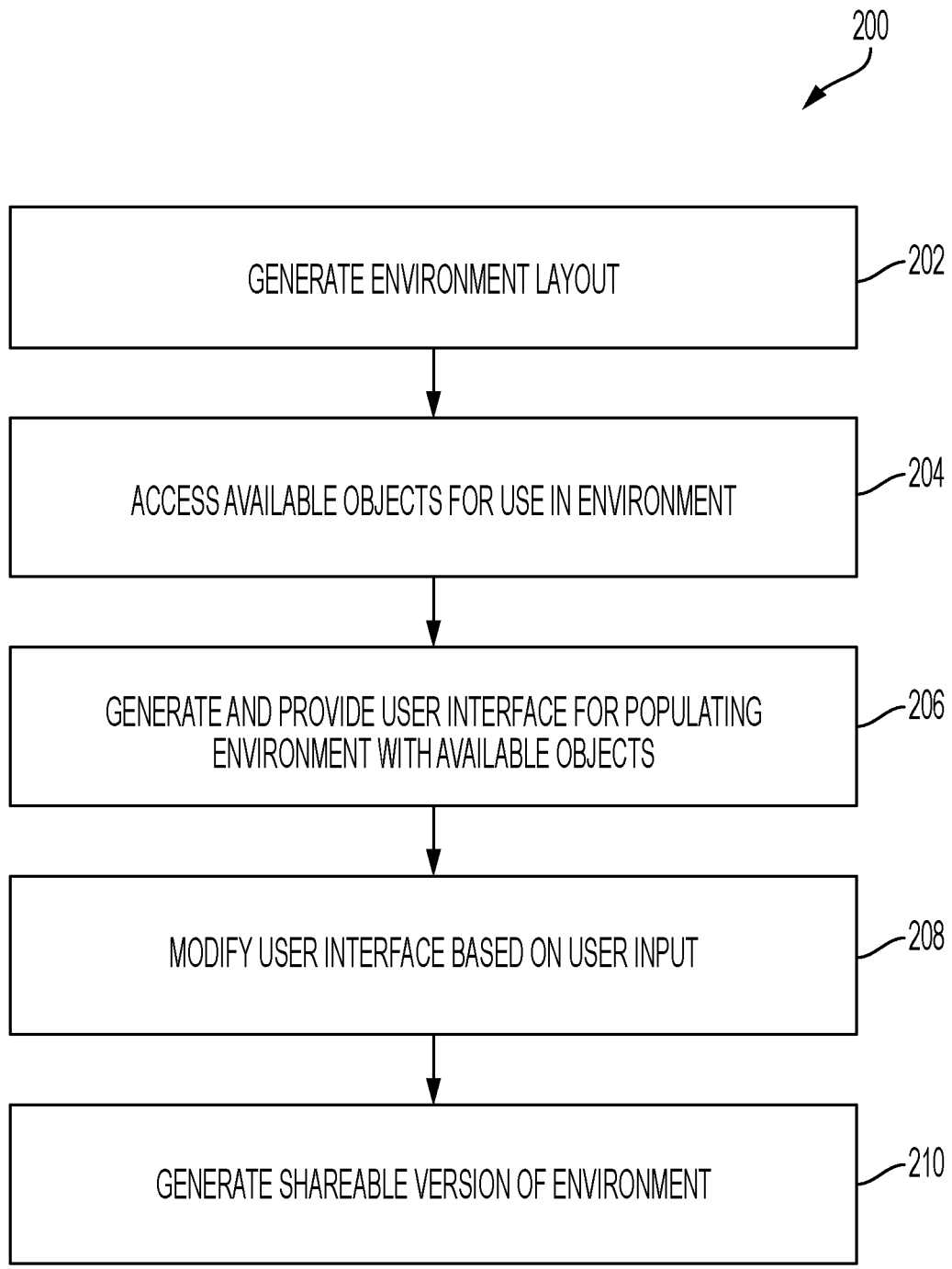
FIG. 2 depicts an example of a process for providing a CAD platform with a customized set of design objects in accordance with various aspects of the present disclosure.

Turning now to FIG. 2, additional details are provided regarding a computer-aided design module 200 for providing a CAD platform with a customized set of design objects. For instance, the flow diagram shown in FIG. 2 may correspond to operations executed by computing hardware found in the CAD design and object acquisition and management computing system 100 as it executes the computer-aided design module 200.

In some aspects, the CAD design and object acquisition and management computing system 100, when executing steps related to the computer-aided design module 200, provides a computer-aided design platform to a user device 120 and generates a customized graphical user interface using that includes a customized set of objects for placing within the customized graphical user interface based on user inputs. For example, the CAD design and object acquisition and management computing system 100 may provide the CAD platform as a website accessible over a network 150 by a user via a client application 122, such as a browser application, executing on a user device 120. In another example, the CAD design and object acquisition and management computing system 100 may provide the CAD platform and/or application through the client application 122 executing on the user device 120 in which the client application 122 may be a proprietary software application installed on the user device 120.

At operation 202, the computer-aided design module 200 generates an environment layout. In some aspects, the CAD module 200 may generate the environment layout based on user input (e.g., the user may draw the environment layout using input tools on the graphical user interface). In some aspects, the environment layout includes a two dimensional layout. In other aspects, the layout includes a three-dimensional layout. In various aspects, the environment layout corresponds to a real-world location for which the CAD platform is providing design functionality. In particular embodiments, the CAD module 200 is configured to provide sketching, outlining, layout arrangement, and other design functionality using a set of physical objects within a virtual environment that corresponds to the real-world location. In some aspects, the real-world location may be a building or portion thereof, and the set of physical objects may include furniture and other accessories.

In still other aspects, the system of configured to generate a floor plan layout including one or more dimensions determine by one or more laser-scanning and/or imaging techniques. For example, in a particular embodiment, the system may utilize lidar to receive distance data for each room in a particular location in order to generate an environmental layout that includes a correlation to real-world dimensions of each room.

In some aspects, the system may generate the environment layout based on one or more drawings of a physical space. The system may, for example, receive architectural or other structural drawings of a particular physical space. The system may then generate an environment layout having dimensions and a layout that is derived from the drawings. In this way, the system may be configured to ingest a floorplan (e.g., schematic) for a physical space and generate a virtual representation of the floorplan on a graphical user interface.

In particular aspects, the generated layout may include a two-dimensional layout. In other aspects, the system may generate a three-dimensional layout. In still other environments, the system may enable a user to transition between two and three dimensional views of the generated environment layout.

At operation 204, the CAD design and object acquisition and management computing system 100 accesses available objects for use in the environment. For example, the CAD design and object acquisition and management computing system 100 may compile, for a particular user accessing the CAD platform via the user device 120, a customized listing of available objects for placement in the environment. In some aspects, the listing of available objects includes objects that correspond to real-world items (e.g., furniture) owned by an entity on behalf of which the user is accessing the CAD platform (e.g., one or more objects for which the system has stored inventory data, one or more objects that are currently physically located in one or more locations used by a particular organization on behalf of which the user is accessing the CAD platform, etc.). In other aspects, the listing of available objects may include objects that correspond to real-world items that are available for sale from particular manufacturers. The CAD design and object acquisition and management computing system 100 may, in some aspects, access a plurality of third party e-commerce platforms (e.g., by accessing the platforms over a network 150 at the third party computing system(s) 130 for each of the plurality of third party e-commerce platforms. The CAD design and object acquisition and management computing system 100 may then retrieve data, from each of the third party computing system(s) regarding a plurality of objects (e.g., furniture, accessories, etc.) that are available for purchase via the respective platforms. In other aspects, the CAD design and object acquisition and management computing system 100 may access data regarding each object such as, for example: (1) pricing data; (2) availability data (e.g., quantity of the object); (3) logistics data (e.g., lead time, delivery timing, etc.); and/or (4) any other data related to any available or unavailable object from the third party e-commerce platform. In still other aspects, the listing of available objects may include a set of objects that correspond to real-world items that are available for sale in a particular marketplace (i.e., a second-hand furniture marketplace).

As may be understood in light of this disclosure, the set of available objects for any particular user may differ, for example, because each user may be part of an organization with a different existing set of objects. In some aspects, as discussed below with respect to the object management module 600, the CAD design and object acquisition and management computing system 100 may track data related to each object that is currently accessible to an organization (e.g., by virtue of the organization currently owning or leasing a particular quantity of the object). In some aspects, the set of available objects for a given user may be limited by, for example: (1) a desired install time for the designed space (e.g., the system may provide a limited set of objects for use on the CAD platform based on whether each object would be available for acquisition prior to a desired install date provided by the user). In some aspects, the objects may include any acquirable object. In particular aspects, the system may identify acquirable objects by receiving data from a third party aggregator, user input, or other suitable technique.

Figure 3:
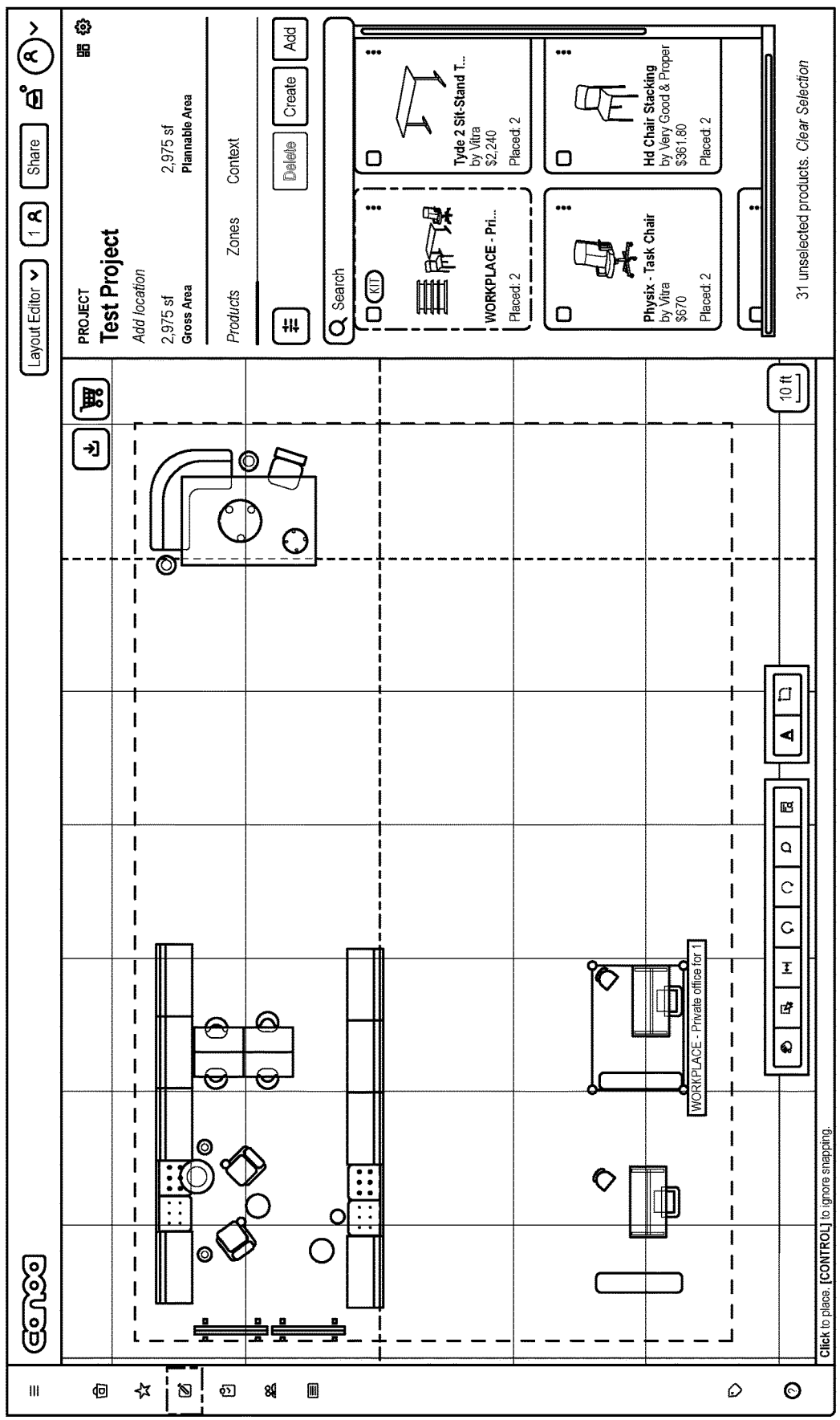
FIG. 3 depicts an example of CAD platform in accordance with various aspects of the present disclosure.

In some aspects, at operation 206, the system generates and provides a user interface for populating the environment with the available objects. In some aspects, the environment is two dimensional, three dimensional, or a combination of the two. The system may, for example, provide a user interface that enables a user to drag and drop or otherwise place a visual representation of each object within the virtual environment. The system may further enable a user to modify a position, orientation, or other characteristic of each object within the virtual environment. In this way, a user may plan, using the CAD platform, a design of a particular physical space that includes a plurality of objects (e.g., furniture, accessories, etc.), with each object encompassing an amount of space relative to the actual size of each object with respect to the virtual environment. The user may, for example, use the CAD platform to design an entire floorplan, including a set of objects. FIG. 3 depicts an exemplary user interface for designing a layout of a set of physical objects within a virtual environment. As may be understood from FIG. 3, the user interface includes a visual representation of a floorplan in which a plurality of objects have been placed. In the embodiment shown in this figure, the visual representation of the floorplan provides a two-dimensional overhead view of the space. As may be understood from this figure, the system enables a user to drag particular objects positioned adjacent the virtual environment into the virtual environment. In response to the user 'placing' an object in the environment, the system generates a two-dimensional overhead view of the object for positioning on the user interface. In this way, the system enables the user to view an image of the actual object prior to placing a wireframe version of the object in the floorplan.

At operation 208, the system modifies the user interface based on user input. The system may modify the user interface to move objects within the floorplan/environment as the user moves each object within the space using the user interface. The system may further add or remove particular objects in response to user input. In some aspects, the system may enable the user to rotate or otherwise reposition each object within the floorplan. In some aspects, the user interface includes a mechanism for adding notes or comments at particular locations on the floorplan.

At operation 210, in some aspects, the system generates a shareable version of the environment to enable collaboration in the design of the particular floorplan. In particular embodiments, the CAD design and object acquisition and management computing system 100 is configured to enable multiple users to manipulate a shared user interface that includes the virtual environment at the same time. In such aspects, the system may enable each user to separately access the CAD platform from different computing devices (e.g., user devices 120) and place and manipulate objects within the same floorplan. The CAD design and object acquisition and management computing system 100 may further enable users to substantially simultaneously place objects, enter comments, etc. within the same floorplan. In particular aspects, the system may display a current cursor position for each user within the user interface. In some aspects, the system may enable users to share a particular floorplan (including the object layout) with other users (e.g., users outside of a particular user's organization). The system may, for example, generate a unique link for accessing the particular floorplan, and enable a user to share the link with others. The system may then, in response to a user accessing the link, provide access to the particular floorplan.

In particular aspects, when a user adds a particular object to their design, the system may automatically add the object into a shopping cart or other listing of objects that may be used in the context of the item acquisition module 700 (described below) for acquisition purposes once a design has been completed.

For illustrative purposes, the computer-aided design module 200 is described with reference to implementations described above with respect to one or more examples described herein. Other implementations, however, are possible. In some aspects, the steps in FIG. 2 may be implemented in program code that is executed by one or more computing devices such as the CAD design and object acquisition and management computing system 100, the user device 120, or other system in FIG. 1. In some aspects, one or more operations shown in FIG. 2 may be omitted or performed in a different order. Similarly, additional operations not shown in FIG. 2 may be performed.

Object Curation Module

Figure 4:
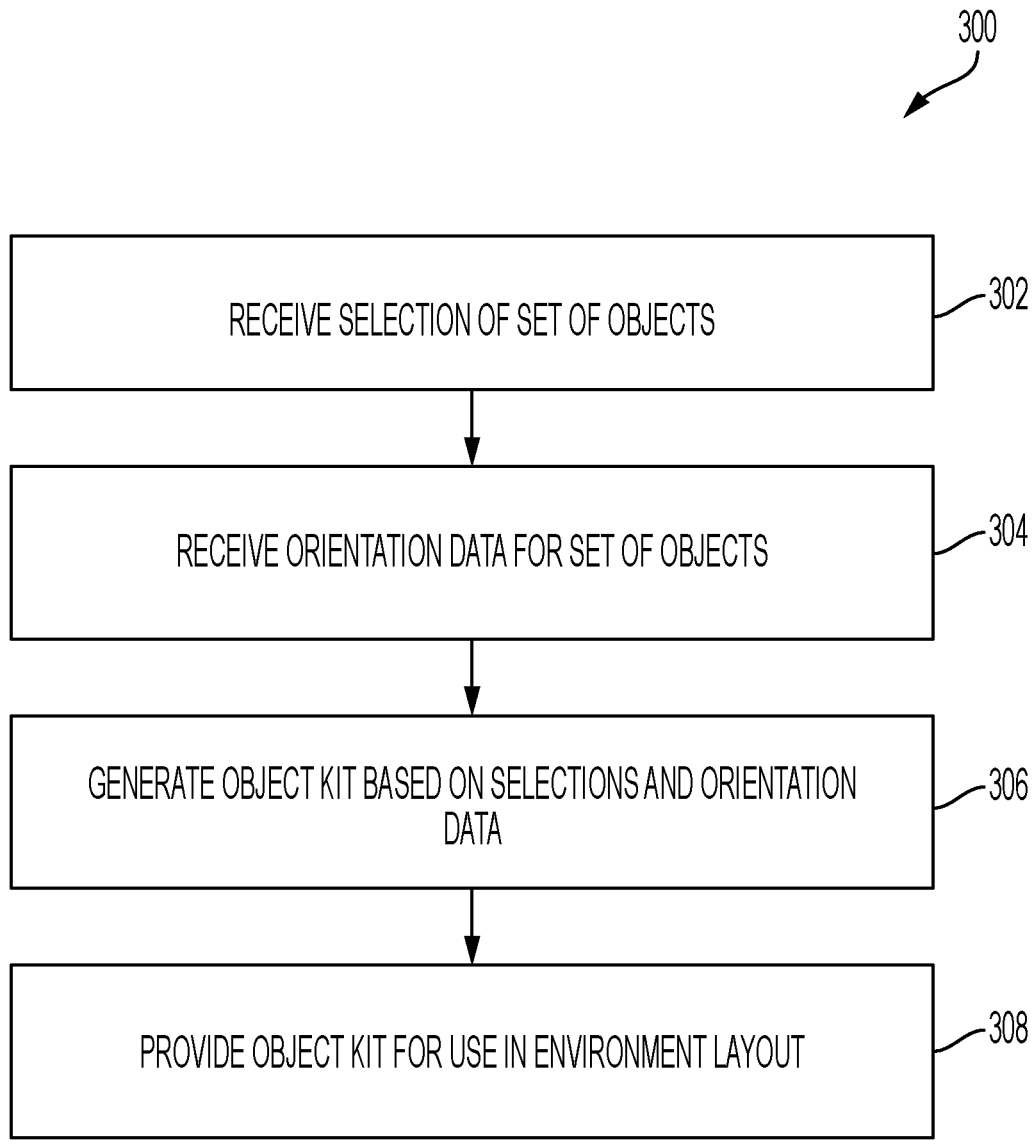
FIG. 4 depicts an example of a process for providing a customized group of design objects in accordance with various aspects of the present disclosure.

Turning now to FIG. 4, additional details are provided regarding an object curation module 300 for providing a customized group of design objects. For instance, the flow diagram shown in FIG. 4 may correspond to operations executed by computing hardware found in the CAD design and object acquisition and management computing system 100 as it executes the object curation module 300.

At operation 302, the object curation module 300 receives a selection of a set of objects. In some aspects, the system receives the selection from a user. In particular aspects, the selection may include a set of related objects (e.g., a particular table objects and a particular number of chair objects).

At operation 304, the object curation module 300 receives orientation data for the set of objects. In some aspects, the orientation data includes a position of each object in the set relative to the remaining objects. In some aspects, the orientation data includes a relative orientation of each object. In this way, the system may provide a set of objects that are spatially arranged as a set such that a user can easily drag and drop the set into the virtual floorplan (e.g., without having to manually position each object in a desired set of objects).

At operation 306 the system generates the object kit based on the selection of objects and orientation data. In various embodiments, the generated object kit includes a listing of each item within the kit. In some aspects the system may store, for each object kit, the orientation data such that, upon selection of the object kit, the system can generate a visual representation of the kit (e.g., for placement within the CAD environment). In various aspects, the system further stores data related to a source of each object from the kit (e.g., acquisition instructions for each object). In particular embodiments, the acquisition instructions may include: (1) logistics data for relocating each object that is already in a particular organization's inventory; (2) acquisition data for objects that must be acquired prior to placing in the physical location that corresponds to the virtual floorplan; (3) etc.

At operation 308, the object curation module 300 provides the object kit for use in the environment layout. In some aspects, the object curation module 300 provides the object kit for other uses of the system. In particular object, the system identifies users of the system for whom each object in the kit is acquirable, and provides the kit for use to such users. In this way, the system may be configured to streamline the design process by enabling a user to select and position sets of objects rather than one object at a time. Conventional techniques for manipulating objects within a graphical design context require subjective determinations applied to imprecise manual operations, such as manually positioning each object in a design environment relative to other objects, manually selecting and inserting each appropriate object, manually navigating to each particular object from a set of available objects, repeating the process for each desired object in a set, etc. Thus, aspects described herein improve computer-implemented processes that are unique to generating user interfaces and improving the usability of user interfaces in a computer-aided design context, thereby providing a more suitable solution for automating tasks previously performed by humans.

Figure 5A:
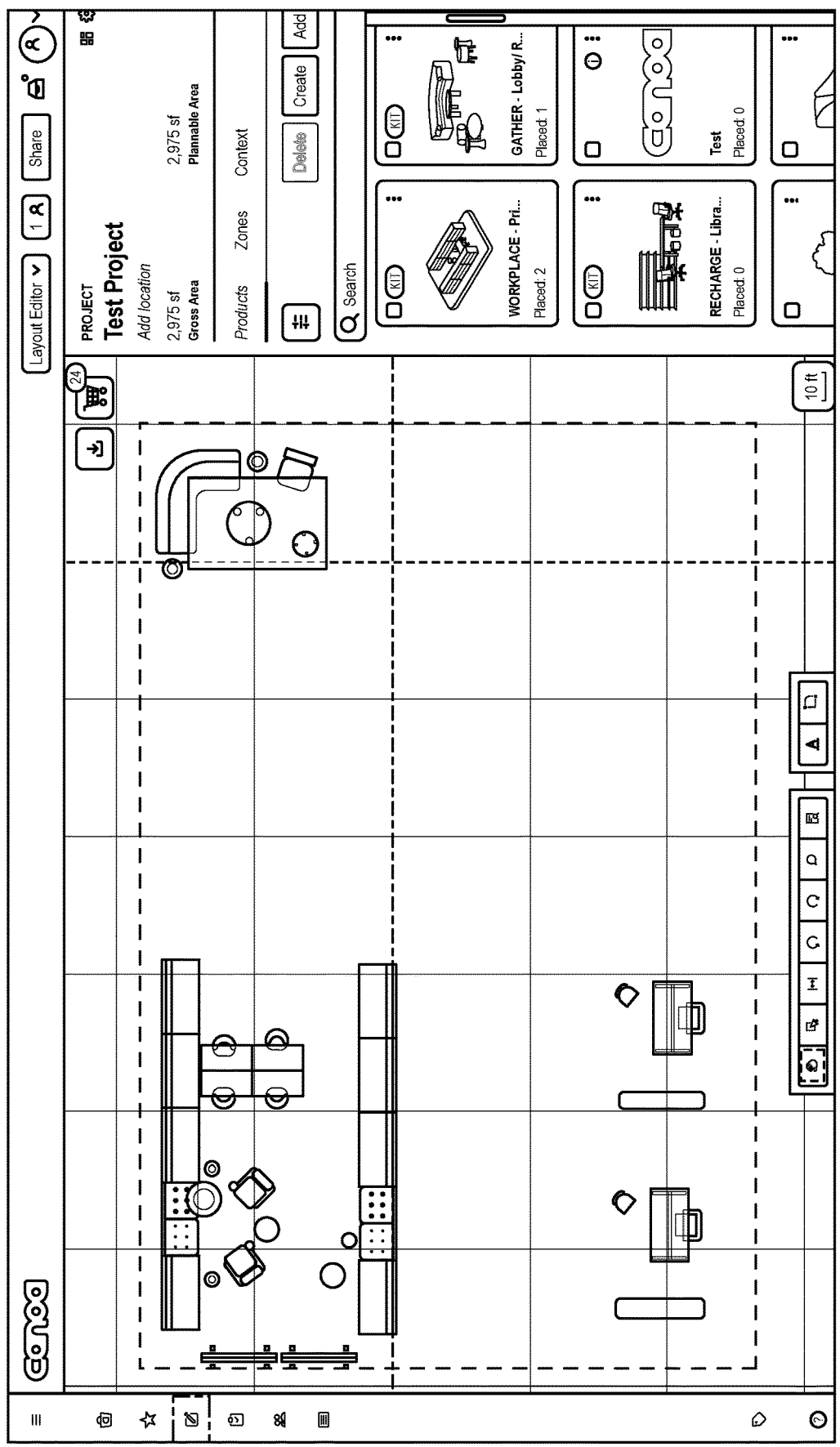
FIG. 5A-5D depict examples of a CAD platform in accordance with various aspects of the present disclosure.
Figure 5B:
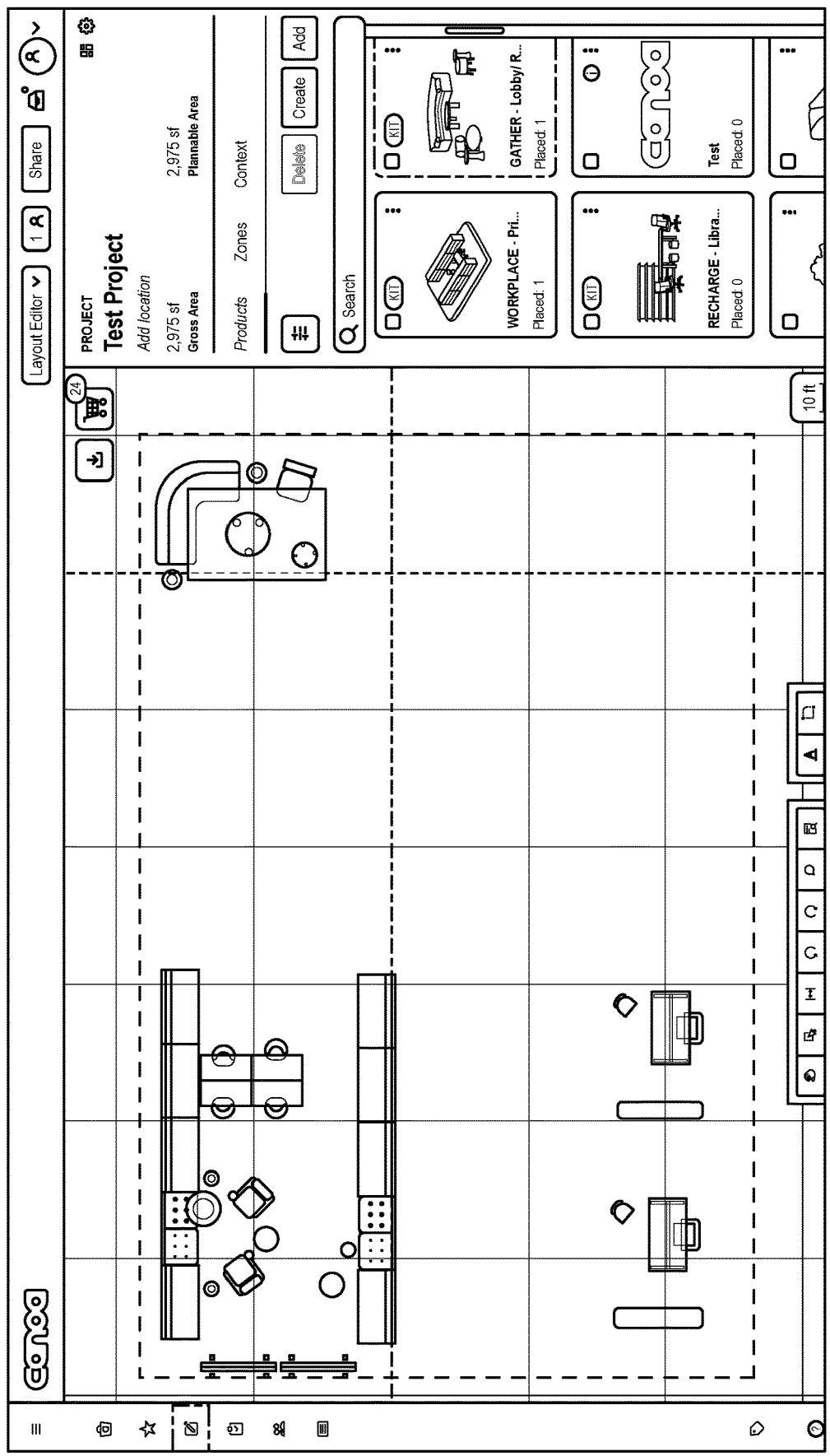
Figure 5C:
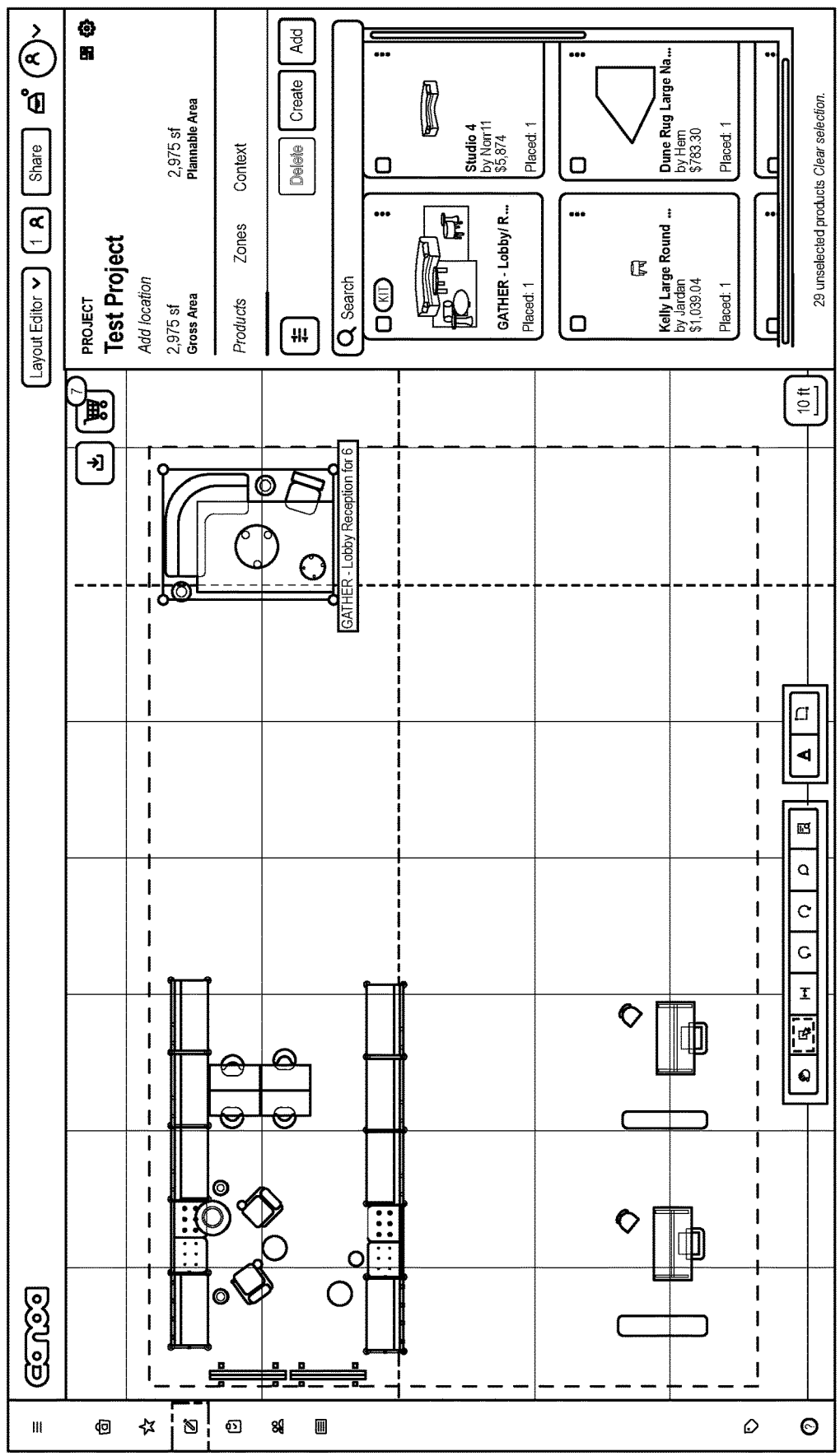
Figure 5D:
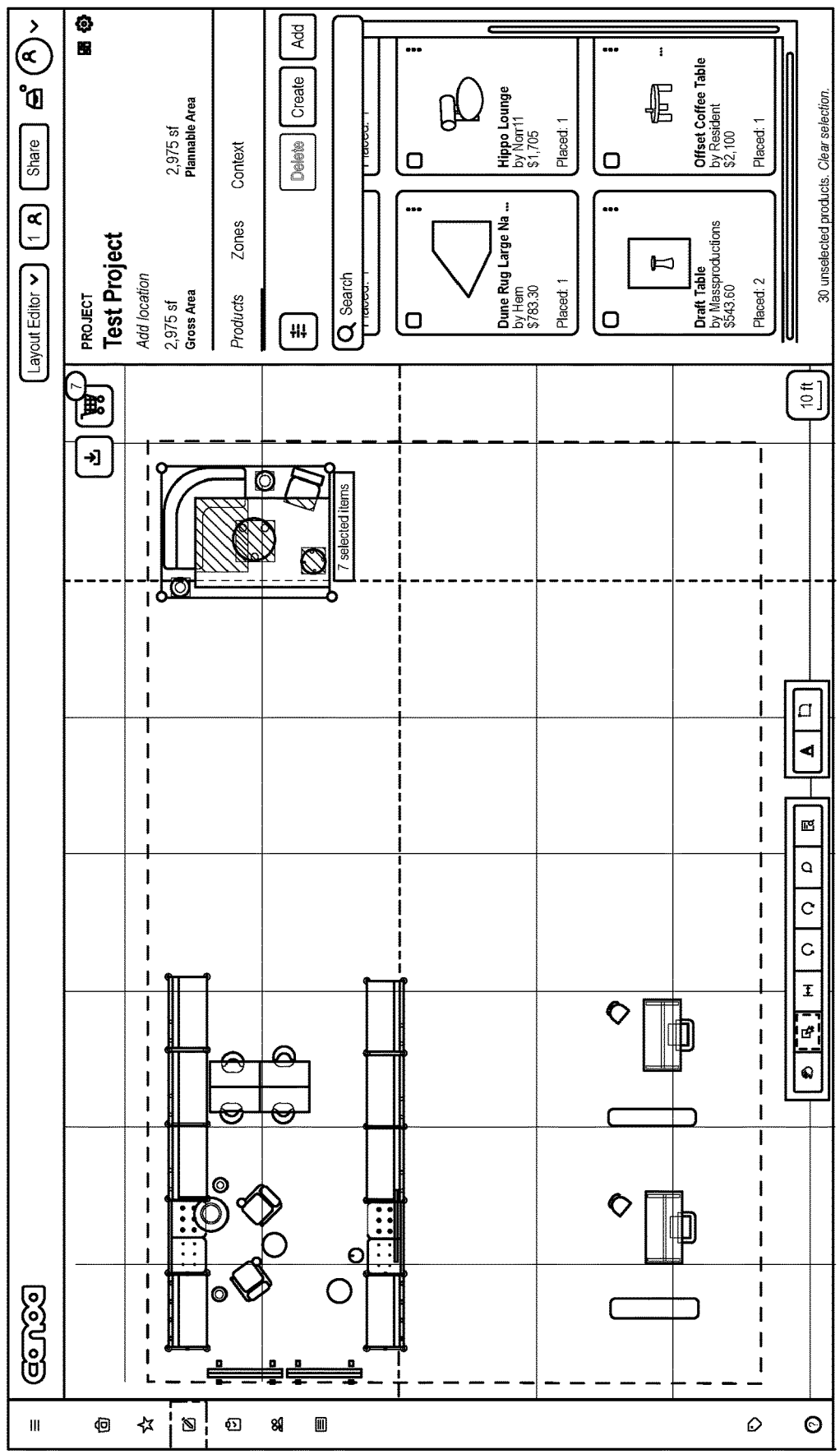

FIG. 5A depicts an exemplary user interface including a CAD design interface. As shown in this figure, the available objects for placement in the design environment include several kits. In particular, a 'Gather' kit is depicted as included a seating object in addition to serval table objects and a rug object. FIG. 5B depicts the user interface of FIG. 5A, with the 'Gather' kit moused over or selected. As shown in this figure, the user interface depicts a preview of the wireframe CAD version of the kit as it will appear once inserted into the design area. FIG. 5C shows the 'Gather' kit outlined in its place in the design. As may be understood from this figure, the kit is depicted as a single item that comprises a plurality of objects. As may be understood from FIG. 5D, the kit is made up of the set of 7 objects that are individually selected in this figure. As may be understood from these figures, a simple drag and drop is all that is required to place the set of objects that make up the kit, oriented relative to one another based on the kit definitions, within the design. As described herein, these kit configurations greatly reduce the time-consuming, cumbersome processes required by conventional computer-aided design systems.

In various aspects, the system is configured to allow users to customize their own kits. In other aspects, the users may replace particular items within a kit with other related items (e.g., replace a particular style of chair with a second style). In this way, the user may universally replace a particular item in a design, rather than having to do so individually.

In some aspects, the system may utilize a machine-learning/artificial intelligence recommendation engine to provide recommendations of related kits to complete a particular design (e.g., or other coordinating objects for a particular kit).

In particular aspects, when a user adds a kit to their design, the system may automatically add each item from the kit into a shopping cart or other listing of objects that may be used in the context of the item acquisition module 700 (described below) for acquisition purposes once a design has been completed.

For illustrative purposes, the object curation module 300 is described with reference to implementations described above with respect to one or more examples described herein. Other implementations, however, are possible. In some aspects, the steps in FIG. 4 may be implemented in program code that is executed by one or more computing devices such as the CAD design and object acquisition and management computing system 100, the user device 120, or other system in FIG. 1. In some aspects, one or more operations shown in FIG. 4 may be omitted or performed in a different order. Similarly, additional operations not shown in FIG. 4 may be performed.

Object Impact Determination Module

Figure 6:
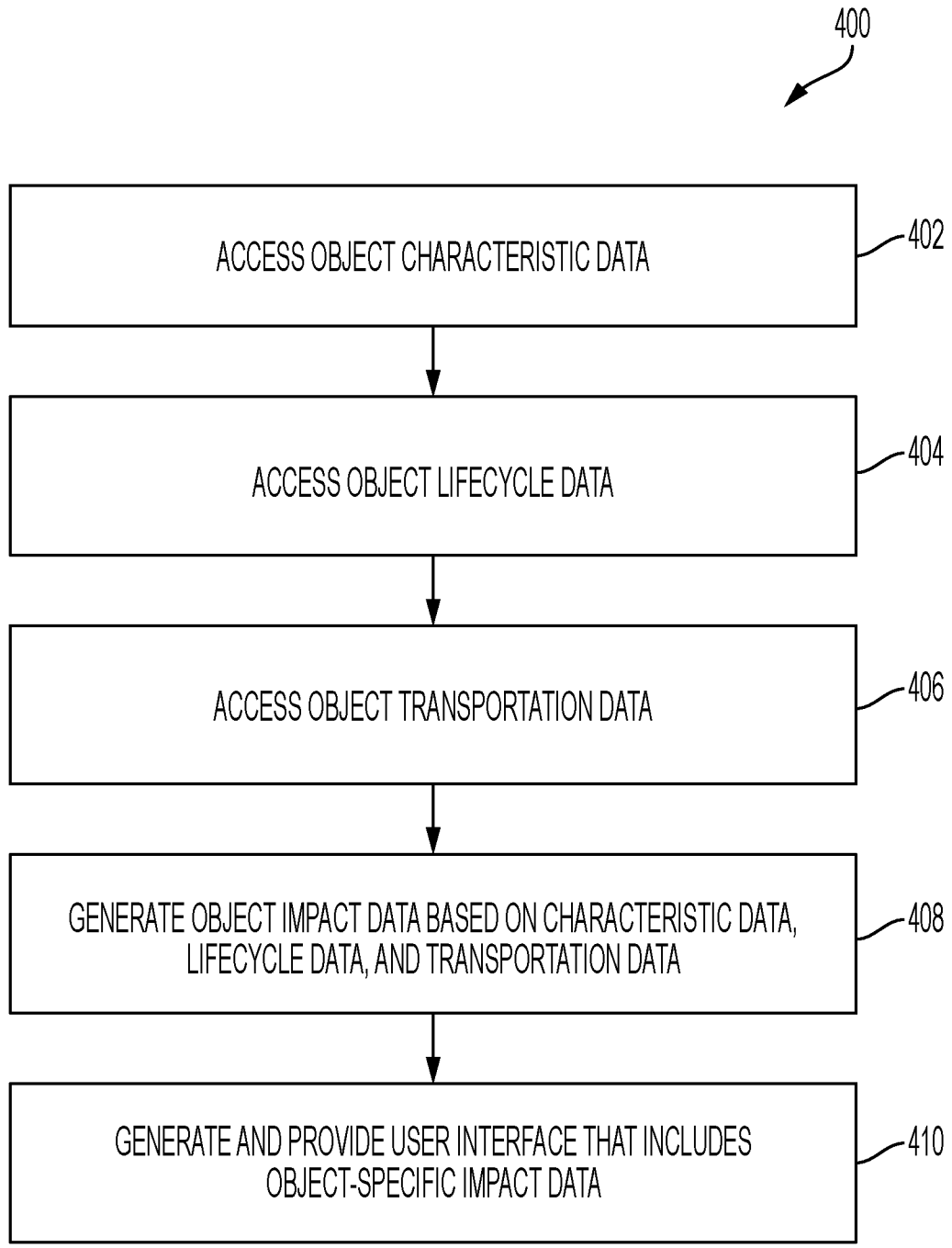
FIG. 6 depicts an example of a process for determining impact data for a particular object in accordance with various aspects of the present disclosure.

Turning now to FIG. 6, additional details are provided regarding an object impact determination module 400 for determining impact data for a particular object. For instance, the flow diagram shown in FIG. 6 may correspond to operations executed by computing hardware found in the CAD design and object acquisition and management computing system 100 as it executes the object impact determination module 400.

At operation 402, the object impact determination module 400 accesses object characteristic data for a particular object. In various aspects, the object characteristic data may include, for example: (1) material composition data (e.g., each material of which the object is composed, including quantities); (2) material sourcing data (e.g., including an origin of each raw material used in the constructions of the object; (3) object source data (e.g., an assembly/construction location of the object; (4) object status (e.g., whether the object is newly manufactured or used); (4) object weight; (5) object size; (6) object cost; and/or (7) other suitable data related to the physical characteristics of the object.

At operation 404, the system accesses object lifecycle data for the object. In particular embodiments, the object lifecycle data includes a number of prior owners of the object. In the context of a used object, the system may, for example, store data related to each sale of the object using the CAD/e-commerce platform. The system may, for example, determine that a particular object was purchased new by a first organization, sold to a second organization, and is now being offered for sale by the second organization.

At operation 406, the object curation module 300 accessed object transportation data. In some aspects, the object transportation data includes data related to transportation requirements for transporting the real-world object from a current location to a final location (e.g., a real-world location that corresponds to a designed floorplan such that a user is considering acquiring the object for placement in the real-world location). In other aspects, the transportation data includes prior transportation data for the object such as, for example, transportation data related to: (1) transportation from a manufacturing facility to a storage facility; (2) transportation data related to transportation from a storage facility to a location for a first owner organization; (3) etc.

At operation 408, the system generates object impact data based on the characteristic data, lifecycle data, and transportation data. In some aspects, the object impact data may indicate an environmental impact of the object (e.g., an amount of carbon utilized in the production and transportation of the object). For example, the CAD design and object acquisition and management computing system 100 may process the characteristic data, lifecycle data, and transportation data using a rules-based model, a machine-learning model, or both to generate the object impact data. For example, the rules-based model, machine learning model, or combination of both may be configured to process the characteristic data, lifecycle data, and transportation data, and/or the like in determining the impact data (e.g., by generating an impact value) for a particular object. For example, the rules-based model, machine learning model, or combination of both may be configured to generate an impact value by identifying individual impact levels for each stage of transportation required in the placement and movement of the object, each step of manufacturing of the object, the number of uses of the object, etc.

For example, according to particular aspects, the object impact determination module 400 may involve using a rules-based model in generating the impact data (e.g., impact value). The rules-based model may comprise a set of rules that assigns respective impact values at each stage of product and/or transportation of a particular object. For example, the set of rules may define one or more rules for assigning impact values based on material type, manufacturing process, etc. In other aspects, the set of rules may be defined to ignore particular production and/or transportation stages for assigning an impact value to particular objects when those objects have been reused one or more times. Accordingly, an organization (e.g., on the CAD design and object acquisition and management computing system 100) may maintain the set of rules in some type of data storage, such as a database (e.g., the one or more data repositories 140), from which the CAD design and object acquisition and management computing system 100 can access the set of rules for generating the impact value.

According to other aspects, the CAD design and object acquisition and management computing system 100 may utilize a machine learning model in generating an impact value. Here, the machine learning model may be trained using historical data on determine impact value for similar objects (e.g., with similar transportation histories, similar manufacturing processes, that contain similar materials, etc.). Accordingly, the machine learning model may be configured using a variety of different types of supervised or unsupervised trained models such as, for example, support vector machine, naive Bayes, decision tree, neural network, and/or the like.

According to still other aspects, the object impact determination module 400 may involve using a combination of the rules-based model and the machine learning model in generating an impact value (e.g., or other impact data) for an object. In various aspects, each object may have an object-specific impact value (e.g., because otherwise identical objects may have a different use and/or transportation history). As such, it can be technically challenging to determine an object specific-impact value. Various aspects described herein provide improved techniques for determining such values and/or data.

Figure 7:
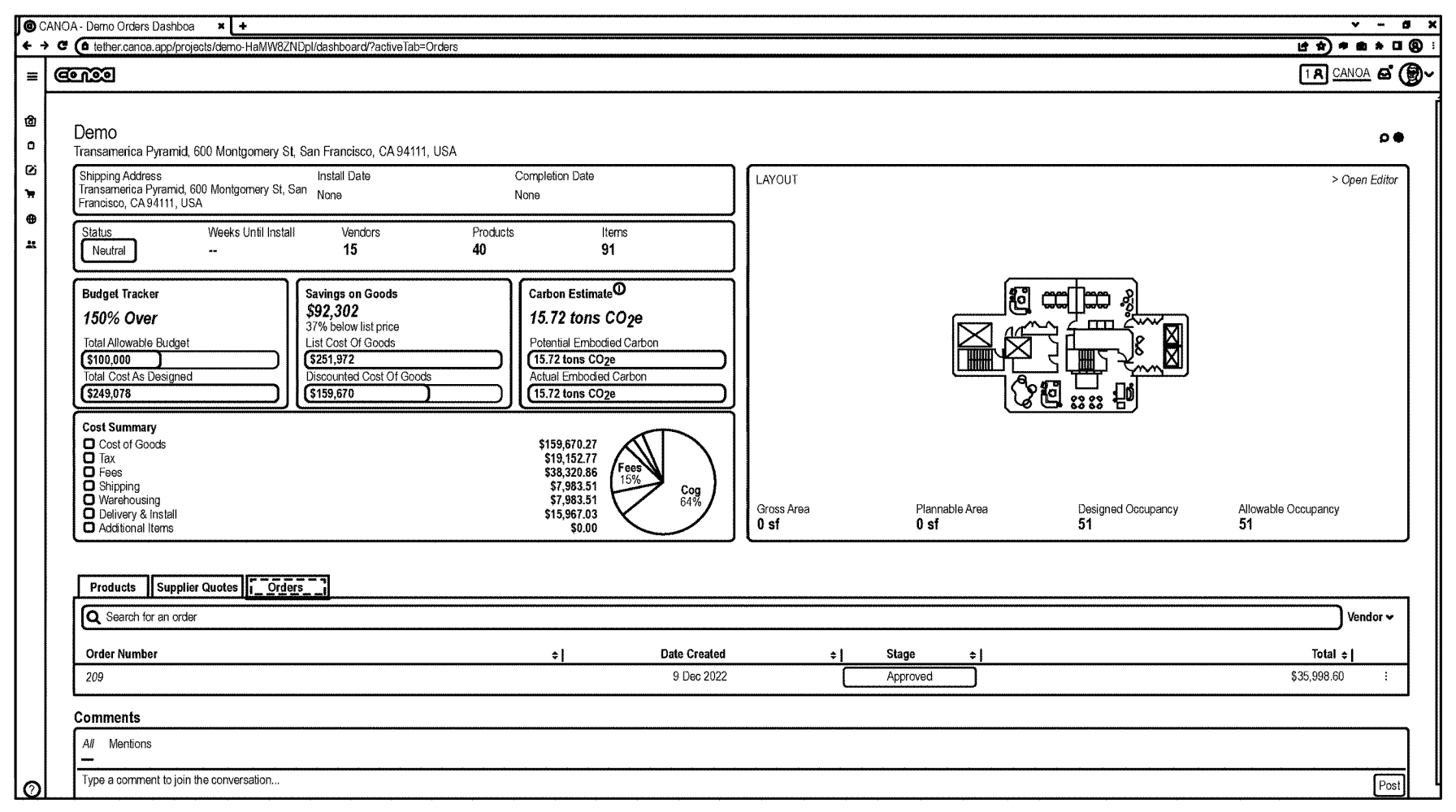

At operation 410, the system generates and provides a user interface that includes object-specific impact data. In some aspects, the system displays the data in association with each selectable object in the design environment. In other aspects, the system displays overall impact data for each item included in a particular design. FIG. 7 depicts an exemplary design interface, showing the total carbon estimate (e.g., impact value) for a particular design.

For illustrative purposes, the object impact determination module 500 is described with reference to implementations described above with respect to one or more examples described herein. Other implementations, however, are possible. In some aspects, the steps in FIG. 6 may be implemented in program code that is executed by one or more computing devices such as the CAD design and object acquisition and management computing system 100, the user device 120, or other system in FIG. 1. In some aspects, one or more operations shown in FIG. 6 may be omitted or performed in a different order. Similarly, additional operations not shown in FIG. 6 may be performed.

Object Ingestion Module

Figure 8:
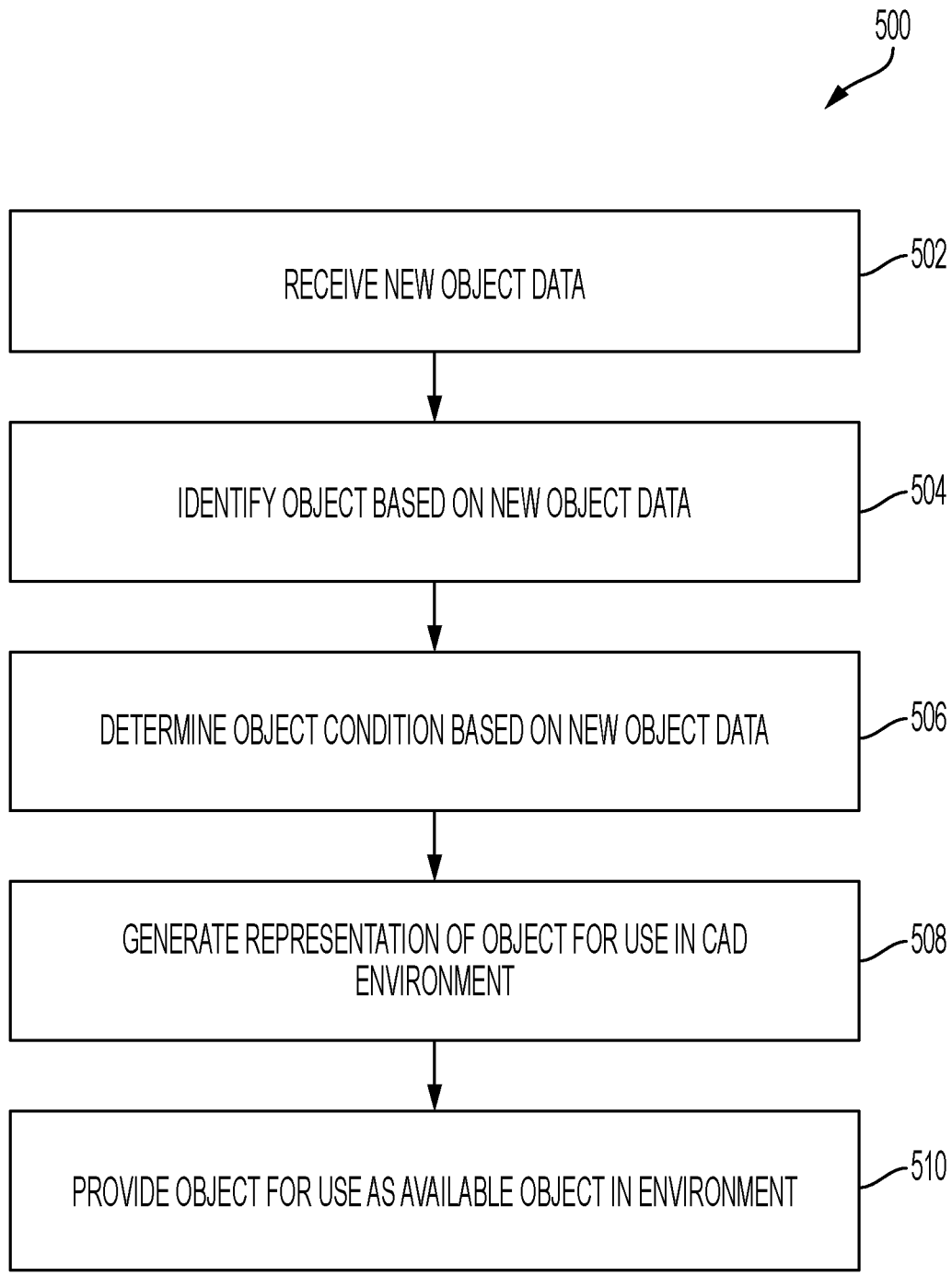
FIG. 8 depicts an example of a process for adding new objects for use on a CAD platform in accordance with various aspects of the present disclosure.

Turning now to FIG. 8, additional details are provided regarding an object ingestion module 500 for adding new objects for use on a CAD platform. For instance, the flow diagram shown in FIG. 8 may correspond to operations executed by computing hardware found in the CAD design and object acquisition and management computing system 100 as it executes the object ingestion module 500.

At operation 502, the object ingestion module 502 receives new object data for an object. In various aspects, the new object data may include, for example: (1) one or more images; (2) descriptive text (e.g., color, model name, etc.); (3) condition data; (4) a unique identifier for an object; and/or (5) other data related to a particular object. In some aspects, the system may ingest a three dimensional image (e.g., produced using a suitable lidar 3D camera) for use in the machine learning process described below, to identify a particular object from the image (e.g., 3D image).

At operation 504, the system identifies the object based on the new object data. In some aspects, the object ingestion module 500 may use a classification machine-learning model on the new object data to classify the object. In some aspects, the classification machine-learning model may generate a feature representation that includes components that represent different types of potential objects for the particular object. Each component provides a prediction (e.g., a prediction value) as to whether the object is a particular type of object, a particular model of object, etc. The classification machine-learning model may include multiple classifiers for the different types of objects that may be indexed by the system. For example, the classification machine-learning model may include classifiers for identifying objects such as: (1) object type; (2) object brand; (3) object color; (4) object model; (5) and/or the like. Therefore, the object ingestion module 502 may process each piece of new object data using the classification machine-learning model in extracting classification data for the object.

Here, according to particular aspects, the classification model may comprise an ensemble of multiple classifiers. For instance, the classification model may include a classifier for each object category. For example, the classification model may include a first classifier for the category "object type," a second classifier for the category "model," a third classifier for the bias category "make," and so forth. The classification model may provide a data instance (e.g., different data elements that make up the data instance) from the data set as input to the classification model and the model may generate an output for the data instance that may comprise a representation (e.g., vector representation) that includes a component for each sub-category found in an object category providing the prediction (e.g., value) on the applicability of the sub-category to the data instance. Furthermore, the representation may provide a confidence (e.g., confidence value) for each prediction on the applicability of the corresponding sub-category of the bias category.

According to some aspects, the classifier may be a Bidirectional Encoder Representations from Transformers ("BERT") classifier. A fine-tuning process may be carried out for training the BERT classifier that involves using training data sets having attributes that recur across one or more industries to train the classifier for a corresponding classification task. The classification task could include classifying an object based on object data (e.g., image) as belonging to one or more of the different sub-categories found in a particular object category.

Additionally, or alternatively, the data instances may include media data such as images. The classification model can generate one or more embedded representations of the media data. For example, according to some aspects, a classification engine may process the media data (e.g., an image) using a convolutional neural network to generate the one or more embedded representations of the media data. Again, an embedded representation may comprise a vector representation of the media data having components with numerical values. The embedded representation may serve as one or more context information, characteristics, attributes, and/or the like of the media data. According to various aspects, the classification engine may perform other types of pre-processing to place the data instances in a more favorable format for classification analysis such as one-hot encoding to generate encoded representations of data, such as categorical data, and/or speech-to-text to convert audio/video data into text data. According to some aspects, the classification engine may concatenate and/or merge the different representations of a data instance to form a combined representation of the data instance. The system may then determine a classification of a particular object using the classification analysis described above, or using any other suitable technique. In some aspects, the system may enable a user to provide feedback as to an accuracy of a particular classification, and provide the feedback as training data.

At operation 506, the object ingestion module 500 determines the object condition based on the new object data. As discussed above, the object ingestion module 500 may further use the classification machine-learning model to assign a condition to the object (e.g., by comparing the new object data to object data for previously classified objects. In various aspects, the system may ingest a 3D image (e.g., from a suitable lidar 3D camera) and identify particular object data for the object (e.g., color, condition, markings, etc.).

At operation 508, the object ingestion module 500 generates a representation of the object for use in a CAD environment. In some aspects, the system receives the representation from the user (e.g., the user provides an image of the representation for use by the CAD platform. In other aspects, the system accesses an existing representation for the identified object based on the object (e.g., the system accesses and/or retrieves a previously generated representation for the object based on the identification). In other aspects, the system is configured to generate the representation substantially automatically (e.g., from the new object data, such as generating a wireframe two-dimensional representation of the object from the one or more images). In particular embodiments, the system may, for example, receive one or more images of the object. The system may then generate a two (e.g., or three) dimensional representation of the object for use in the CAD environment. In some aspects, a two-dimensional representation of the object may include an overhead wireframe view of the object. In various embodiments, the system may utilize one or more generative artificial intelligence techniques to generate the two-dimensional representation. For example, the system may utilize a generative AI system trained using existing object representations to generate a new object representation in a style and manner that mimics the style of the existing representations. The generative AI model may, for example, be trained to recognize patterns in existing representations and use those patterns to generate new, similar representations based on images of real-world objects.

At operation 510, the system then provides the object for use as an available object in the environment (e.g., in the context of the computer-aided design module 200) described herein. In still other aspects, the system may be configured to provide the object for use by the user that provided the new object data. In other aspects, the system is configured to provide the object for use by other users of the platform, along with acquisition instructions (e.g., to enable the system to initiate logistical operations to transfer the object from the user that provided the new object data to a second, purchasing user)

For illustrative purposes, the object ingestion module 500 is described with reference to implementations described above with respect to one or more examples described herein. Other implementations, however, are possible. In some aspects, the steps in FIG. 8 may be implemented in program code that is executed by one or more computing devices such as the CAD design and object acquisition and management computing system 100, the user device 120, or other system in FIG. 1. In some aspects, one or more operations shown in FIG. 8 may be omitted or performed in a different order. Similarly, additional operations not shown in FIG. 8 may be performed.

Object Management Module

Figure 9:
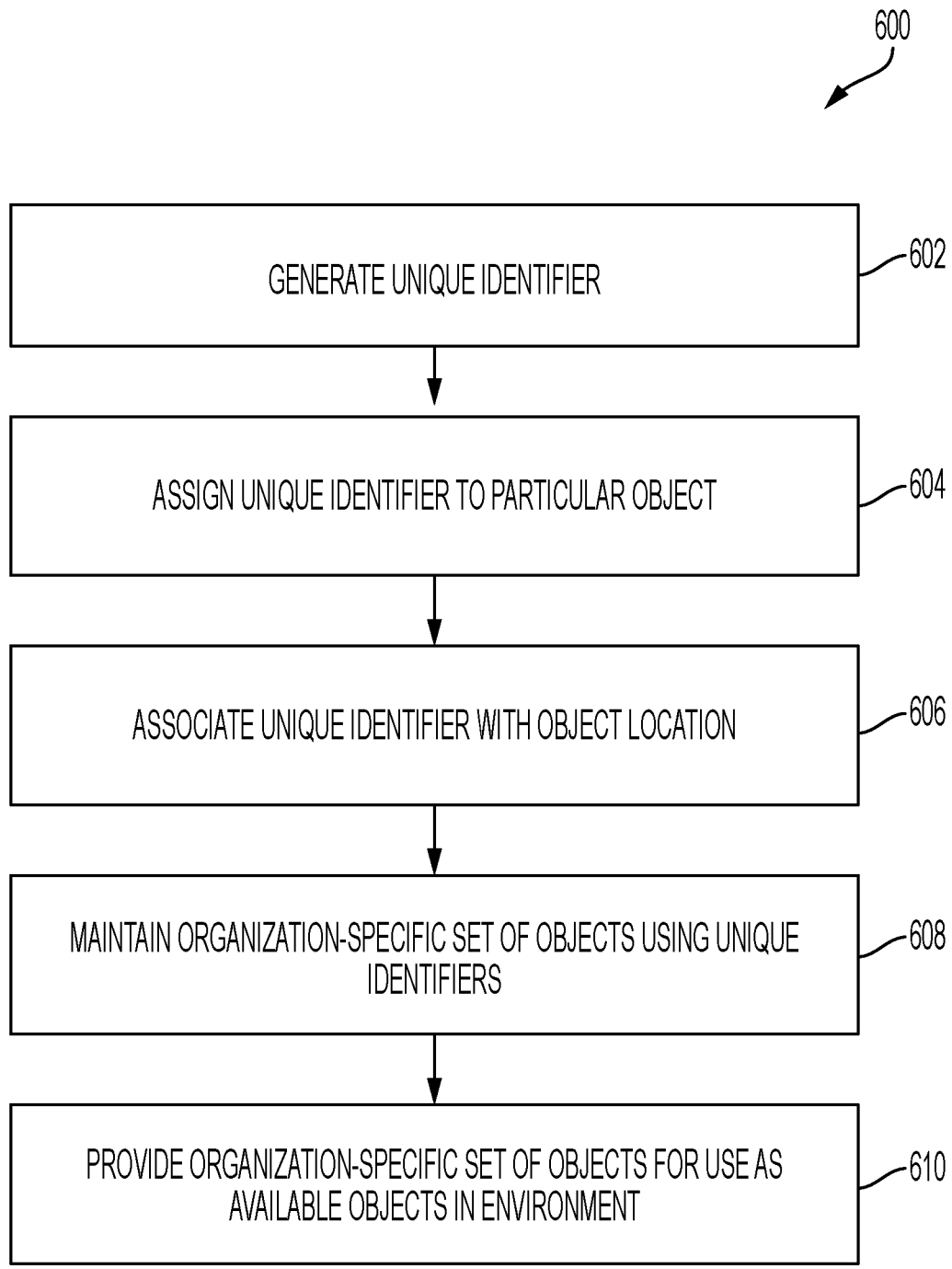
FIG. 9 depicts an example of a process for managing a set of objects on an organization level in accordance with various aspects of the present disclosure.

Turning now to FIG. 9, additional details are provided regarding an object management module 600 for managing a set of objects on an organization level. For instance, the flow diagram shown in FIG. 9 may correspond to operations executed by computing hardware found in the CAD design and object acquisition and management computing system 100 as it executes the object management module 600.

Beginning at operation 602, the object management module 600 generates a unique identifier. In some aspect, the system is configured to generate any suitable unique identifier, such as a unique character string or other unique identifier. In particular embodiments, the unique identifier may be encoded in a computer-readable medium (e.g., barcode, QR code, etc.), RFID tag, or other suitable machine-readable indicia and/or identifier.

At operation 604, the system assigns the unique identifier to a particular object. In some aspects, each objects is a real-world object (e.g., furniture, accessory, etc.) owned, leased, or otherwise accessible to a particular organization. In this way, the system may enable an organization to catalog all of its physical property in the context of the system. In particular aspects, the system is configured to assign a unique identifier to each object acquired by a particular organization, for example, as described in the context of the object acquisition module 700 herein. In other aspects, the system is configured to assign a unique identifier to each object in response to ingestion of the new object by a user (e.g., in the context of the object ingestion module 500 described herein). In some aspects, the system is configured to facilitate application of the unique identifier to each object. In various aspects, the system is configured to generate a user interface including instructions for affixing a machine-readable object (e.g., bar code, QR code, RFID tag, etc.) to each object that identifies the unique identifier. This may occur, for example, during installation of a set of objects in a building, at delivery, or at any other suitable time. In some aspects, in response to a user scanning a machine-readable mechanism on an object, the system is configured to access a CAD design that includes the object, indicating a location of where the object belongs. In this way, installation of newly delivered objects may be streamlined by providing a visual indication of an object's ultimate location.

At operation 606, the object management module associates each unique identifier with a real-world location of the object. For example, the system may store (e.g., in a suitable data repository 140) a location identifier in association with each unique object identifier, where the location identifier identifies a real-world location of the object identified by the unique identifier. For example, the location data may define: (1) a physical address where the object is located; (2) a room identifier at the physical address where the object is located; (3) etc. In this way, an organization may track each object in its inventory of objects, in addition to its current location. In some aspects, the system is configured to assign location data (e.g., building, floor, room, etc.) to a particular object based on placement of the object on a floorplan using the CAD platform (e.g., in response to a user indicating, via the platform, that a design has been implemented).

At operation 608, the system maintains an organization-specific set of objects using the unique identifiers (e.g., for each organization that utilizes the system). In some aspects, the system provides an inventory management system that maintains an up-to-date listing of all objects (e.g., furniture, accessories, etc.) available to, owned by, leased by etc. a particular organization. In this way, an organization can maintain a listing of all objects in its control as well as the locations of each object. In particular aspects, the system is configured to update the inventory for the organization in response to the organization purchasing new objects (e.g., via the system), selling existing objects, (e.g., via the system), etc.

In some aspects, at operation 610, the system provides the organization-specific set of objects for use as available object in a CAD environment. In some aspects, the listing of available objects on the CAD platform described herein includes objects that correspond to real-world items (e.g., furniture) owned by an entity or organization on behalf of which the user is accessing the CAD platform (e.g., one or more objects for which the system has stored inventory data, one or more objects that are currently physically located in one or more locations used by a particular organization on behalf of which the user is accessing the CAD platform, etc.). In this way, the customized listing of object for use in the platform is further made specific to a user (e.g., within a particular organization) as the user may have access to objects for design purposes that are owned by the organization, but may be otherwise unavailable.

In some aspects, the system may interface with one or more external systems to provide functionality related to the organization-specific set of objects. For example, the system may enable an organization to track objects in the set of objects for loss and/or theft. In other aspects, the system may interface with one or more accounting computer systems to track depreciation and other data for each object in the set of objects.

For illustrative purposes, the object management module 600 is described with reference to implementations described above with respect to one or more examples described herein. Other implementations, however, are possible. In some aspects, the steps in FIG. 9 may be implemented in program code that is executed by one or more computing devices such as the CAD design and object acquisition and management computing system 100, the user device 120, or other system in FIG. 1. In some aspects, one or more operations shown in FIG. 9 may be omitted or performed in a different order. Similarly, additional operations not shown in FIG. 9 may be performed.

Object Acquisition Module

Figure 10:
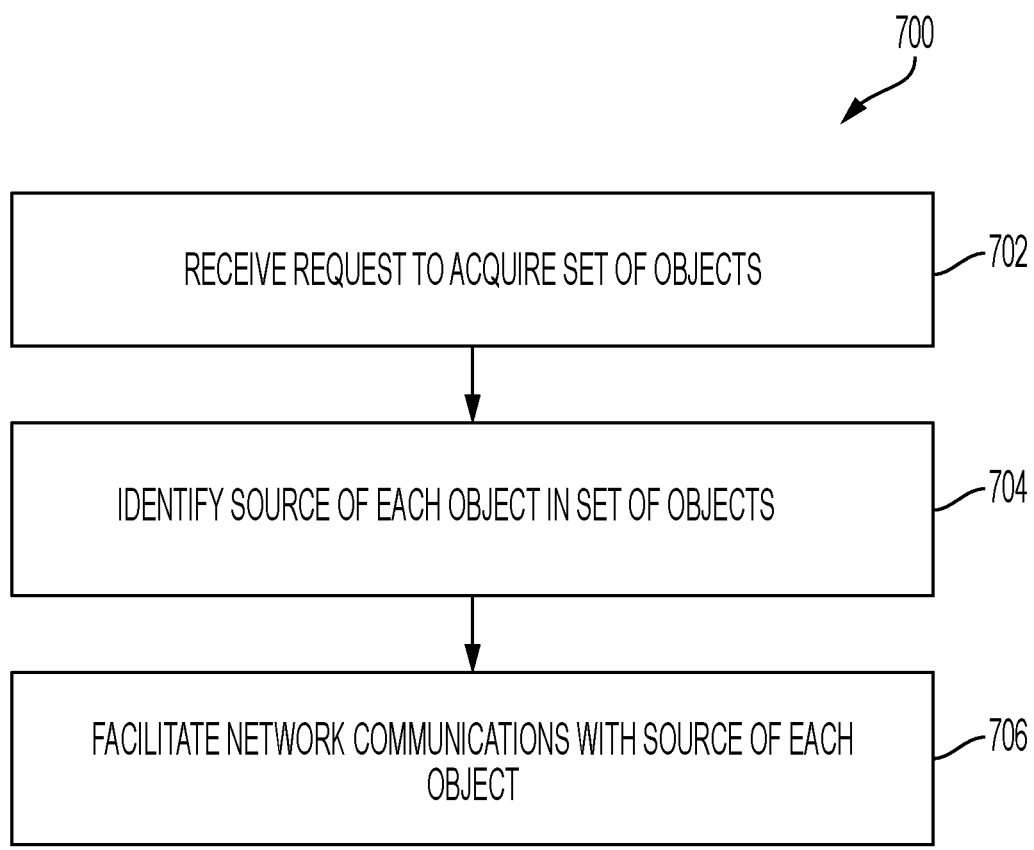
FIG. 10 depicts an example of a process for initiating network communication with third party computing systems associated with particular objects utilized on a CAD platform in accordance with various aspects of the present disclosure.

Turning now to FIG. 10, additional details are provided regarding an object acquisition module 700 for initiating network communication with third party computing systems associated with particular objects utilized on a CAD platform. For instance, the flow diagram shown in FIG. 10 may correspond to operations executed by computing hardware found in the CAD design and object acquisition and management computing system 100 as it executes the object acquisition module 700.

In various aspects, the object acquisition module 700, at operation 702 receives a request to acquire a set of objects. In particular aspects, the object acquisition module 700 receives the request in response to completion, by a user (e.g., set of users) of design for a particular location (e.g., floorplan) using the CAD platform described herein. In various aspects, the request is a request to acquire a real-world version of each object utilized in the floorplan design. For example, once a user has completed the design phase of a project (e.g., using the design software described herein), the user may desire to acquire each object utilized in the design for placement in the real-world location that corresponds to the designed space (e.g., office or other location). In this way, the user may desire to streamline the design and acquisition process to complete the real world installation of a desired set of objects in a desired location. In some aspects, each object may have a different source.

As such, at operation 704, the system identifies the source of each object in the set of objects. In some aspects, the system may identify at least some objects as being currently available to the organization (e.g., in a location that corresponds to the designed location or a different location. In other aspects, the system may identify at least some objects as being available from one or more third party entities. In various embodiments, the system may identify at least some object as being available via the CAD Design and Object Acquisition and Management Computing system 100 (e.g., for sale and purchasable via an e-commerce platform provided via the CAD Design and Object Acquisition and Management Computing system 100). In still other aspects, the system may identify particular objects as available for purchase via a third party computing system.

At operation 706, the system facilitates network communications with the identified source of each object to facilitate acquisition of each object. In various aspects, acquisition of each object may include, for example: (1) purchase of each object from an identifies source, and logistics operations to relocate each object to the real-world location of the design; (2) logistics operation to relocate the object from a first location controlled by the entity to the real-world location of the design; etc.

In some aspects, the system is configured to facilitate network communications with a plurality of third party computing systems 130 to initiate an order process for each object. In various aspects, this process is performed automatically from a single interface. Certain aspects of the present system provide improvements to computing systems used for enabling a user to acquire each object utilized in a particular design by, for example, reducing cumbersome or time-consuming processes for acquiring each individual item from a plurality of different sources. Additional or alternative aspects reduce cumbersome, time-consuming processes for identifying each object source, navigating to different platforms for initiation of acquisition of each object form third party computing systems, initiating the acquisition of logistics operations for acquiring each item, etc. Such cumbersome processes require the use of arbitrary commands to access each third party system in order to individually facilitate acquisition of each item utilized in a particular design. (e.g., copy pasting links from different locations, navigating to a particular web page that includes each desired object, entering information into the web page in order to facilitate acquisition of the object, repeating these steps for each desired item or set of items, etc.).

In various embodiments, the object acquisition module 700 coordinates each individual object order with each third party entity (e.g., retailer) through individual respective network communication with a third party computing system 130 for each entity. The object acquisition module 700 further sends and receives confirmation communications to and from each third party system relating to distribution of purchase orders, confirming pricing data, facilitating object returns, etc. As noted above, this process occurs automatically for each object that makes up part of an individual design. A user of the platform need only interface with the CAD design and object acquisition and management computing system 100 rather than each third party computing system 130 individually.

Similarly, the CAD design and object acquisition and management computing system 100 initiates necessary logistics operations for relocating objects. For example, the system is configured to generate necessary shipping and/or freight labels to route each object as necessary to a desired real-world location that corresponds to a virtual representation in a particular design. In some aspects, the system initiates or facilitates any other suitable logistical process for managing the acquisition of objects described herein.

In various aspects, in response to facilitation of an acquisition process, the system may further automatically update an inventory for a particular organization (e.g., as described in the object management module 600). In still other aspects, the system may enable an organization to dispose of particular objects via the CAD design and object acquisition and management computing system 100 (e.g., by making the object available for use by other organization users in the CAD platform, and providing the object for sale to a user that integrates the object into a design, and initiates the acquisition process). In still other aspects, the system may initiate a manufacturing process as part of the acquisition process.

In other aspects, the system generates a user interface that displays acquisition status for each particular object. The system may, for example, track acquisition status for each object. In some aspects, the acquisition status may include a current location in a logistics process, a current step in a set of computing operations, etc. In particular aspects, the system configures the interface to include a status indicator indicating the current acquisition status of each object (e.g., or each object in a set of objects having the same acquisition source). In some aspects, the system may generate an alert indicating that a particular acquisition has not met an acquisition metric (e.g., timing estimate). In other aspects, the system may generate a summary interface indicating the initiation of the acquisition for each object (e.g., or set of objects). In this way, the system may provide a dashboard to confirm completion of each acquisition initiated by the system.

For illustrative purposes, the object acquisition module 700 is described with reference to implementations described above with respect to one or more examples described herein. Other implementations, however, are possible. In some aspects, the steps in FIG. 10 may be implemented in program code that is executed by one or more computing devices such as the CAD design and object acquisition and management computing system 100, the user device 120, or other system in FIG. 1. In some aspects, one or more operations shown in FIG. 10 may be omitted or performed in a different order. Similarly, additional operations not shown in FIG. 10 may be performed.

CAD Design Generation Module

Figure 11:
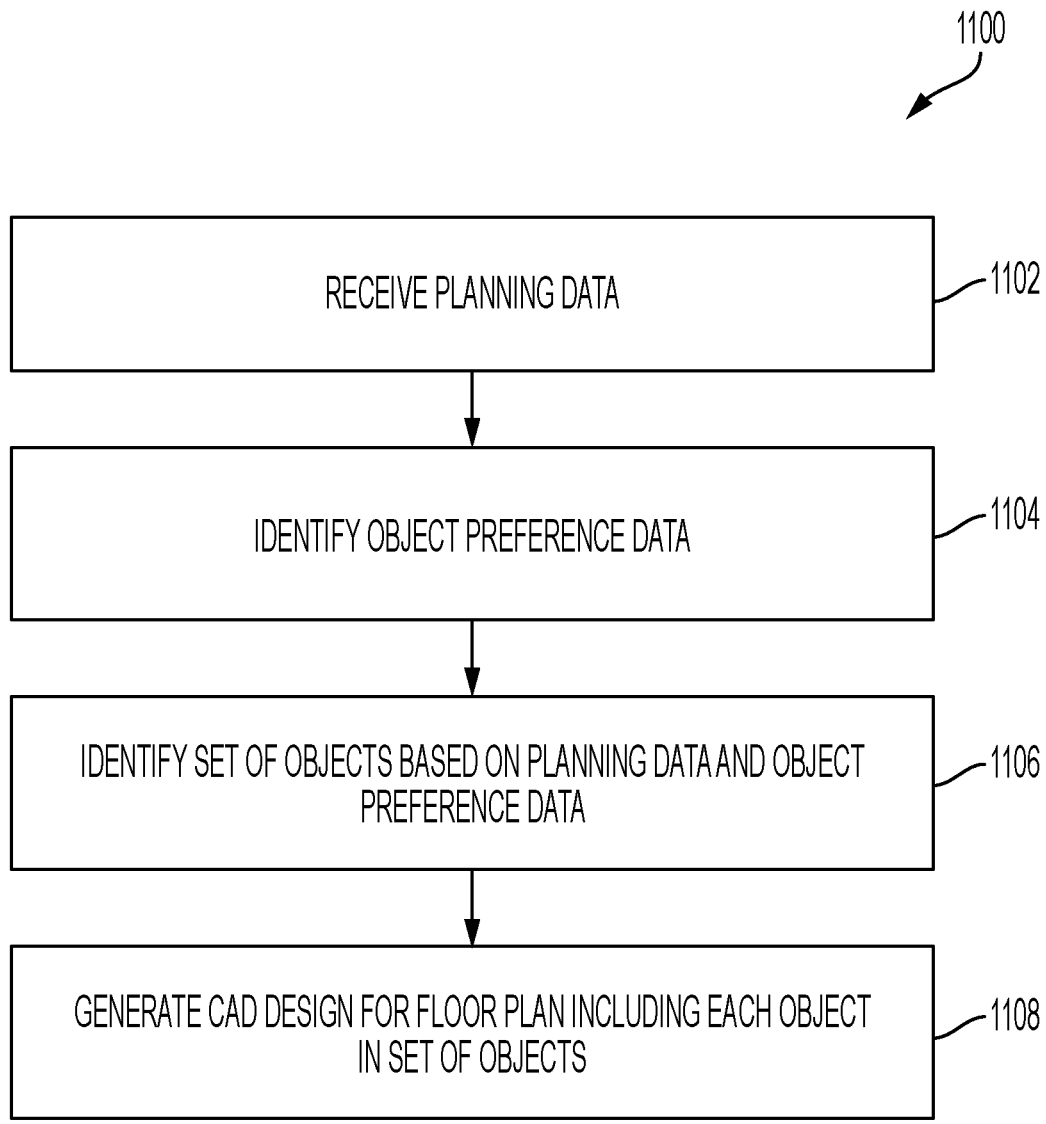
FIG. 11 depicts an example of a process for automatically generating a CAD design for a particular location including a set of objects in accordance with various aspects of the present disclosure.

Turning now to FIG. 11, additional details are provided regarding a CAD design generation module 1100 for automatically generating a CAD design for a particular location including a set of objects in various embodiments. For instance, the flow diagram shown in FIG. 11 may correspond to operations executed by computing hardware found in the CAD design and object acquisition and management computing system 100 as it executes the CAD design generation module 1100.

In various aspects, the CAD design generation module 1100 begins, at operation 1102 by receiving planning data. In particular embodiments, the planning data may include, for example: (1) budget data (e.g., a total budget distributable among a set of objects that make up the full set of objects used in a particular CAD design); (2) environmental impact data (e.g., a total object impact, such as impact determined by the object impact determination module 400 described herein) for the full set of objects to be used in a particular CAD design; (3) design environment data (which may, for example, identify a particular real-world counterpart location to be implemented in a new CAD design); (4) spatial data for the CAD design (which may, for example, identify a number of rooms to be included and populated in a design, a space and/or set of dimensions defining the design space); (5) practical requirements for the real-world version of the space (e.g., a number of employees to be housed in the real-world counterpart of the space, seating requirements, how the space will be utilized, etc.); (6) etc. In some aspects, the system may receive the planning data from a user requesting generation of the CAD design.

In particular aspects, the system may receive, as part of the planning data, an indication of a virtual environment (e.g., virtual floorplan) to be represented by the CAD design. The indication of the virtual environment may indicate a particular virtual floorplan and/or layout for use in the generated CAD design. In some aspects, the system may receive an indication of the virtual environment that includes one or more drawings of a physical space. The system may, for example, receive architectural or other structural drawings of a particular physical space. The system may then generate an environment layout having dimensions and a layout that is derived from the drawings. In this way, the system may be configured to ingest a floorplan for a physical space and generate a virtual representation of the floorplan on a graphical user interface as part of the CAD generation process. In other aspects, the system may receive dimension data, floorplan data, or receive environment data in any other suitable manner. In some embodiments, the system may access stored virtual environmental data (e.g., indicating a structure of a particular real world physical space) in response to receiving a request to generate a CAD design (i.e., a CAD design that includes a set of objects that populate the virtual environment).

The system may further receive planning data indicating a set of needs to be fulfilled by a set of objects for populating the virtual floorplan as part of the CAD design. The set of needs may include, for example, the practical requirements for the real-world version of the space (e.g., seating requirements, equipment requirements, practical use data for the space, etc.).

Continuing to operation 1104, the CAD design generation module 1100, in some aspects, identifies object preference data. In particular aspects, the object preference data may include one or more design preferences. The design preferences may include, for example, particular style preferences, color preferences, and the like. In various embodiments, the design preference data may include a preference to coordinate the set of objects included in the CAD design with one or more objects included in one or more related virtual environments. For example, in response to receiving a request to generate a CAD design for a particular portion of a particular virtual environment that makes up a portion of a real-world floorplan, the system may receive a request to coordinate the set of objects selected for the portion of the real-world floorplan with a set of existing objects that make up the remaining portion of the real-world floorplan. In a particular example, the request may include a request to re-design only a subset of the offices within an office building. As part of the request, the system may receive a request that indicates a desire to coordinate the newly selected set of objects for populating the subset of offices with the existing offices in the building. In this way, the CAD design generation module 110 may generate a CAD design that fits into existing adjacent designs without having to re-design those portions of a real-world building. This may, for example, enable a user to generate a design that recycles existing objects while still enabling an overall set of objects used in a specific office or other space to coordinate across both newly designed portions and existing portions.

At operation 1106, the CAD design generation module 1100 identifies a set of objects based on the planning data and the object preference data. For example, the CAD design and object acquisition and management computing system 100 may process the planning data and the object preference data using a rules-based model, a machine-learning model, or both to identify the set of objects. For example, the rules-based model, machine learning model, or combination of both may be configured to process the planning data and the object preference data, and/or the like in identifying a set of objects that satisfies one or more requirements derived from the planning data and/or the object preference data. For example, the rules-based model, machine learning model, or combination of both may be configured to generate a set of requirements for the set of objects that includes a set of requirements determined by the planning data and the object preference data. The set of requirements may include, for example: (1) a minimum number of one or more types of objects (e.g., seating objects, table objects, lighting objects, equipment objects, etc.) required to make up the set of objects; (2) a total budget impact of the complete set of objects; (3) a total environmental impact of the set of objects; (4) style requirements for each object in the set of objects; (5) etc.

The system may then, according to particular aspects, use a rules-based model in identifying the set of objects, such that the set of objects satisfies each requirement. The rules-based model may comprise a set of rules defined by the set of requirements. In some aspects, the rules-based model may assign a priority to each requirement, such that particular requirements are weighted more highly when identifying the set of objects. For example, the set of rules may define one or more rule preferences that assign a greater weight to particular requirements (e.g., number of seats, including particular equipment, etc.), while providing more flexibility to other requirements (e.g., budget). In various aspects, the rules-based model may draw from a set of objects that is unique to a particular organization (e.g., available to or otherwise acquirable by the organization) when selecting the set of objects. In some aspects, the set of objects unique to a particular organization may be identified using any suitable technique described herein (e.g., any technique for identifying a user-specific set of objects). Accordingly, an organization (e.g., the CAD design and object acquisition and management computing system 100) may maintain the set of rules in some type of data storage, such as a database (e.g., the one or more data repositories 140), from which the CAD design and object acquisition and management computing system 100 can access the set of rules for selecting the set of objects for use in the CAD design.

According to other aspects, the CAD design and object acquisition and management computing system 100 may utilize a machine learning model in generating a set of objects. Here, the machine learning model may be trained using historical data including prior sets of objects that met similar requirements to those identified based on the planning data and the object preference data (e.g., within budget limits, seating requirements, number of rooms to populate with objects, etc.). For example, the system may use the machine learning model to identify a set of objects used in related designs for the organization, objects used by related organizations (e.g., similar industry, similar location, similar location type, etc.). Accordingly, the machine learning model may be configured using a variety of different types of supervised or unsupervised trained models such as, for example, support vector machine, naive Bayes, decision tree, neural network, and/or the like.

According to still other aspects, the CAD design generation module 1100 may involve using a combination of the rules-based model and the machine learning model in identifying and/or selecting a set of objects to use in the generated CAD design. In various aspects, each object in the set of objects may need to individually satisfy each requirements in the set of requirements. As such, it can be technically challenging to determine complete set of objects that satisfies the full set of requirements. Various aspects described herein provide improved techniques for determining such objects for use in a generated CAD design.

Next, at operations 1108, the CAD design generation module 1100 generates a CAD design for a floor plan including each object in the set of objects. In some aspects, the system generates the floor plan based on the indication of the virtual environment (e.g., that includes one or more drawings of a physical space). The system may, for example, receive architectural or other structural drawings of a particular physical space and generate the virtual floorplan based on the architectural or structural drawings (e.g., such that the virtual environment includes an environment that defines a set of spatial relationships that corelate to the real-world version of the physical space, with similar relative dimensions, layout, etc.). In some aspects, the system may generate a virtual environment based on actual measurement data for a physical space. This may include, for example, receiving user-provided dimensions during generation of a virtual floorplan (e.g., user provided dimensions indicating one or more lengths, widths, heights, proportions, etc. of a particular portion of the virtual environment). The system may then generate an environment layout having dimensions and a layout that is derived from the drawings. In this way, the system may be configured to generate a virtual representation of the floorplan on a graphical user interface as part of the CAD generation process.

In other aspects, the system may then populate the virtual environment (e.g., floorplan) with the set of objects identified at operation 1106. In various aspects, populating the virtual environment with the set of objects may include, for example: (1) placing each object in the set of objects within the environment; (2) orienting each object in a particular orientation with respect to the environment and one/or more adjacent objects; (3) determining a number of each type of object to place in a particular portion of the environment; (4) etc.

In various aspects, the CAD design and object acquisition and management computing system 100 may process the set of objects in the virtual environment using a rules-based model, a machine-learning model, or both to determine a position and orientation of each object in the set of objects.

For example, the rules-based model, machine learning model, or combination of both may be configured to process the set of objects, the virtual environment, and/or the like in determining a position and orientation of each object in order to generate the CAD design. For example, the rules-based model, machine learning model, or combination of both may be configured to generate a CAD design that includes each object in a particular location and orientation that fulfills one or more rules and/or use requirements of each particular type of object in the set of objects, as defined by the available space in the virtual floorplan. The set of requirements may include, for example: (1) minimum offsets for particular types of objects (e.g., minimum distances between chairs and tables, lighting components, structural components such as walls and columns, etc.); (2) relational rules that define spatial relationships between a first type of object and a second type of object (e.g., a particular type of table requires a particular set of seating objects, a particular type of desk requires a particular type of seating object, etc.); (3) orientation requirements for particular types of objects individually and in relation to each other (e.g., a seating object should not be placed directly next to a wall and facing the wall); (4) minimum lighting requirements (e.g., such that a particular space has sufficient lighting; (5) etc.

The system may then, according to particular aspects, use a rules-based model in selecting a position and orientation for each object such that each object in the set of objects satisfies each requirement. The rules-based model may comprise a set of rules defined by the set of requirements. Accordingly, an organization (e.g., the CAD design and object acquisition and management computing system 100) may maintain the set of rules in some type of data storage, such as a database (e.g., the one or more data repositories 140), from which the CAD design and object acquisition and management computing system 100 can access the set of rules for determining a position and orientation of each object in the CAD design.

According to other aspects, the CAD design and object acquisition and management computing system 100 may utilize a machine learning model to select one or more of a position or orientation of each object (e.g., with respect to the virtual floorplan and other objects). Here, the machine learning model may be trained using historical data including how objects are placed in other virtual designs. For example, if a particular object type is typically placed a particular way in relation to a second object type and/or a structural feature of the space, the system may determine a location for such a particular object type based on prior placements. In some aspects, the system may determine a particular room in the virtual environment in which to place a particular object based on where such objects are placed (e.g., which type of room) in other designs. For example, a particular object type may be limited to placement in a certain portion of the virtual environment based on that object's placement being limited to such a portion in other, related designs. Accordingly, the machine learning model may be configured using a variety of different types of supervised or unsupervised trained models such as, for example, support vector machine, naive Bayes, decision tree, neural network, and/or the like.

According to still other aspects, the CAD design generation module 1100 may involve using a combination of the rules-based model and the machine learning model determining a position and orientation of each object in the set of objects in the generated CAD design. In various aspects, each object in the set of objects may need to individually satisfy each requirements in the set of requirements. As such, it can be technically challenging to generate a CAD design that includes the identified set of objects, each in a position and orientation that satisfies the full set of requirements. Various aspects described herein provide improved techniques for determining such placement for use in a generated CAD design.

In particular aspects, the system may, after generating a CAD design (e.g., substantially automatically based on planning and preference data) enable a user to initiate an object acquisition process (e.g., as described in the context of the object acquisition module 700 described herein). In other aspects, the system may, after generating the CAD design, initiate network communications between a user of the system and one or more identified third party computing systems (e.g., each of a plurality of third party computing systems associated with each object in the generated CAD design). In this way, the system may be configured to automate the CAD design process and then automate a process for initiating communication with each of a plurality of suppliers of each object that makes up a particular design.

For example, in various embodiments, the system may generate a user interface including contact details, one or more web links, or other indicia for initiating communication with a third party entity (e.g., third party computing system). This may, for example, enable users of the system to experience a more streamlined process when attempting to acquire each of the plurality of objects that make up a particular CAD design.

A significant challenge encountered in the context of user interface generation is providing efficient access to data and functionality available on a computing device or available to the computing device via an online platform. For example, when attempting to interface with third parties that provide products that a user may desire to acquire, the user may be required to manually navigate to each webpage or initiate communications with each entity that provides each of the objects. The process of initiating communication with, or otherwise placing object acquisition orders with each and every entity that provides each and every object can be cumbersome and time-consuming. As such, certain aspects of the present system provide improved user interfaces for providing and displaying contact details, initiating network communications etc. (e.g., by doing so via a centralized interface based on the CAD design).

For illustrative purposes, the CAD design generation module 1100 is described with reference to implementations described above with respect to one or more examples described herein. Other implementations, however, are possible. In some aspects, the steps in FIG. 11 may be implemented in program code that is executed by one or more computing devices such as the CAD design and object acquisition and management computing system 100, the user device 120, or other system in FIG. 1. In some aspects, one or more operations shown in FIG. 11 may be omitted or performed in a different order. Similarly, additional operations not shown in FIG. 11 may be performed.

Object Recommendation Module

Figure 12:
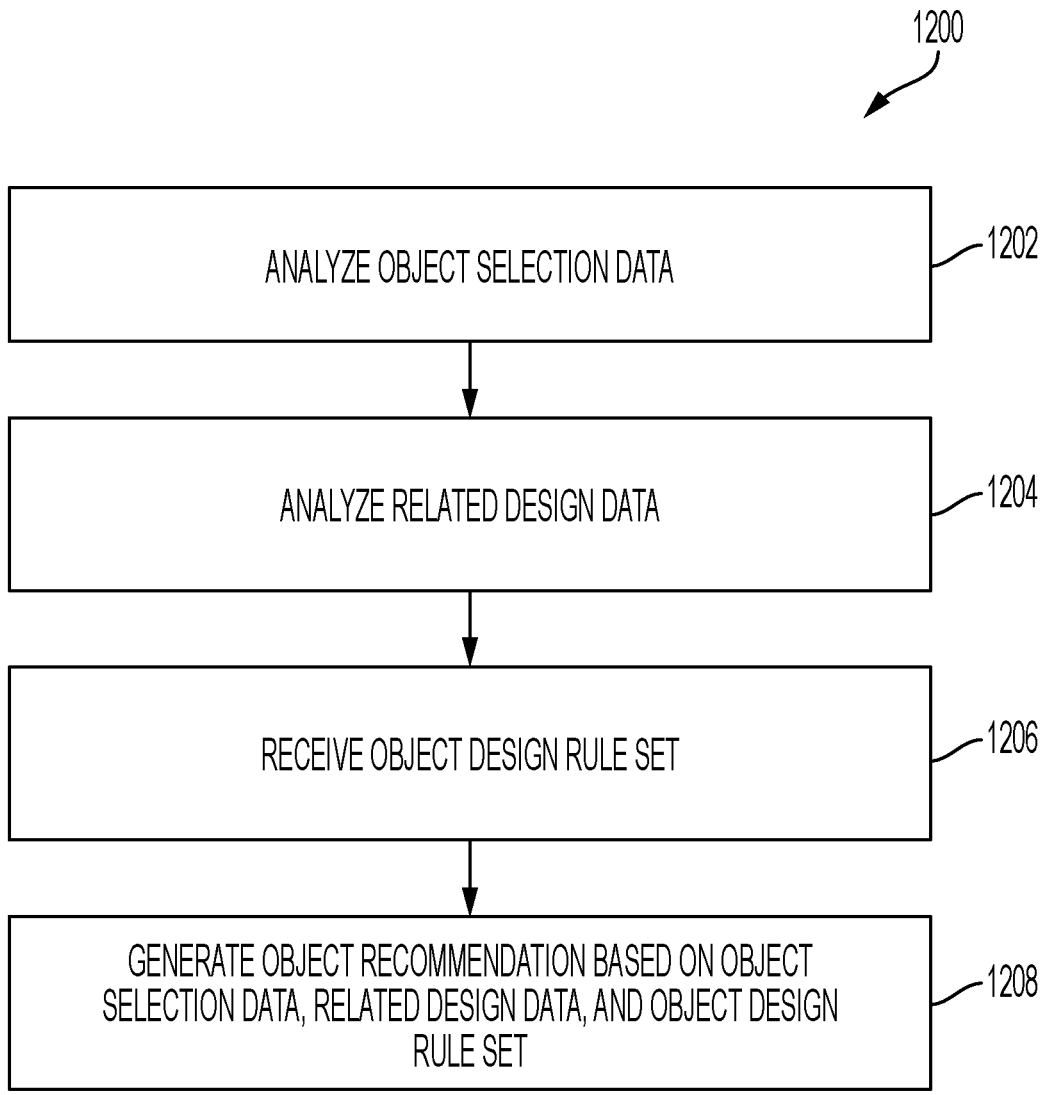
FIG. 12 depicts an example of a process generating an object recommendation in accordance with various aspects of the present disclosure.

Turning now to FIG. 12, additional details are provided regarding an object recommendation module 1200 for generating an object recommendation. In some aspects, the recommendation includes a recommendation as to a particular object for use in conjunction with one or more additional objects. For instance, the flow diagram shown in FIG. 12 may correspond to operations executed by computing hardware found in the CAD design and object acquisition and management computing system 100 as it executes the computer-aided design module 200.

In various aspects, the object recommendation module 1200 begins, at operation 1202 by analyzing object selection data. In some aspects, the system receives a selection of a particular object (e.g., or set of objects) currently being utilized in a particular CAD design within a virtual environment. In some aspects, the object is an object of a particular type. In other aspects, the object includes a particular set of object properties (e.g., dimensions, size, color, condition, object type, set of features, etc.).

At operation 1204, the object recommendation module 1200 analyzes related design data. In some aspects, the related design data may include analyzing one or more objects used in conjunction with the selected object (e.g., set of objects) in one or more other designs (e.g., one or more other designs for the particular organization, designs of similarly situated organizations, etc.). In some aspects, the system derives design recommendations for a particular user (e.g., based on past designs by that particular user). In other aspects, the system generate design recommendations for a user that are specific to an organization to which the user is a member (e.g., a particular organization may include a plurality of system users that may create designs on behalf of the organization). In still other aspects, the system may generate recommendations based on similar users (e.g., users that have used similar design elements on prior designs, etc.). In other aspects, when generating recommendations on behalf of an organization for which the user is generating a design, the system may generate recommendations based on preferences of similarly situated entities (e.g., entities in the same industry, in the same geographic area, with similar functional needs for a designed space, etc.)

For example, the system may generate a recommendation for a replacement object that includes one or more objects used in conjunction with nearby objects to the selected objects in prior designs. In some aspects, the design related data may include data analyzed for objects selected in conjunction with the currently selected object(s) in the current design. In other embodiments, the design data may include object rating data for each potential object. In some aspects, the design data may include a set of objects from which the system may generate a recommendation (e.g., a set of objects that includes only objects available to or otherwise acquirable by the organization).

At operation 1206, the object recommendation module 1200 receives an object design rule set. In some aspects, the object design ruleset may include any suitable rule described herein. In some aspects, the object design ruleset may indicate, for example: (1) one or more rules related to object impact of a recommended object; (2) one or more rules related to cost of a recommended object; (3) one or more rules related to a minimum number of shared properties between an object and a recommended object; (4) one or more relational rules related to a first and second object (e.g., height relation, etc.); (5) one or more rules related to design preferences for a particular organizations (e.g., color palate, texture limitations/preferences, style preferences, and the like); (6) minimum object rating requirements; and/or (7) any other suitable rule related to the selection and generation of a recommendation.

Figure 16:
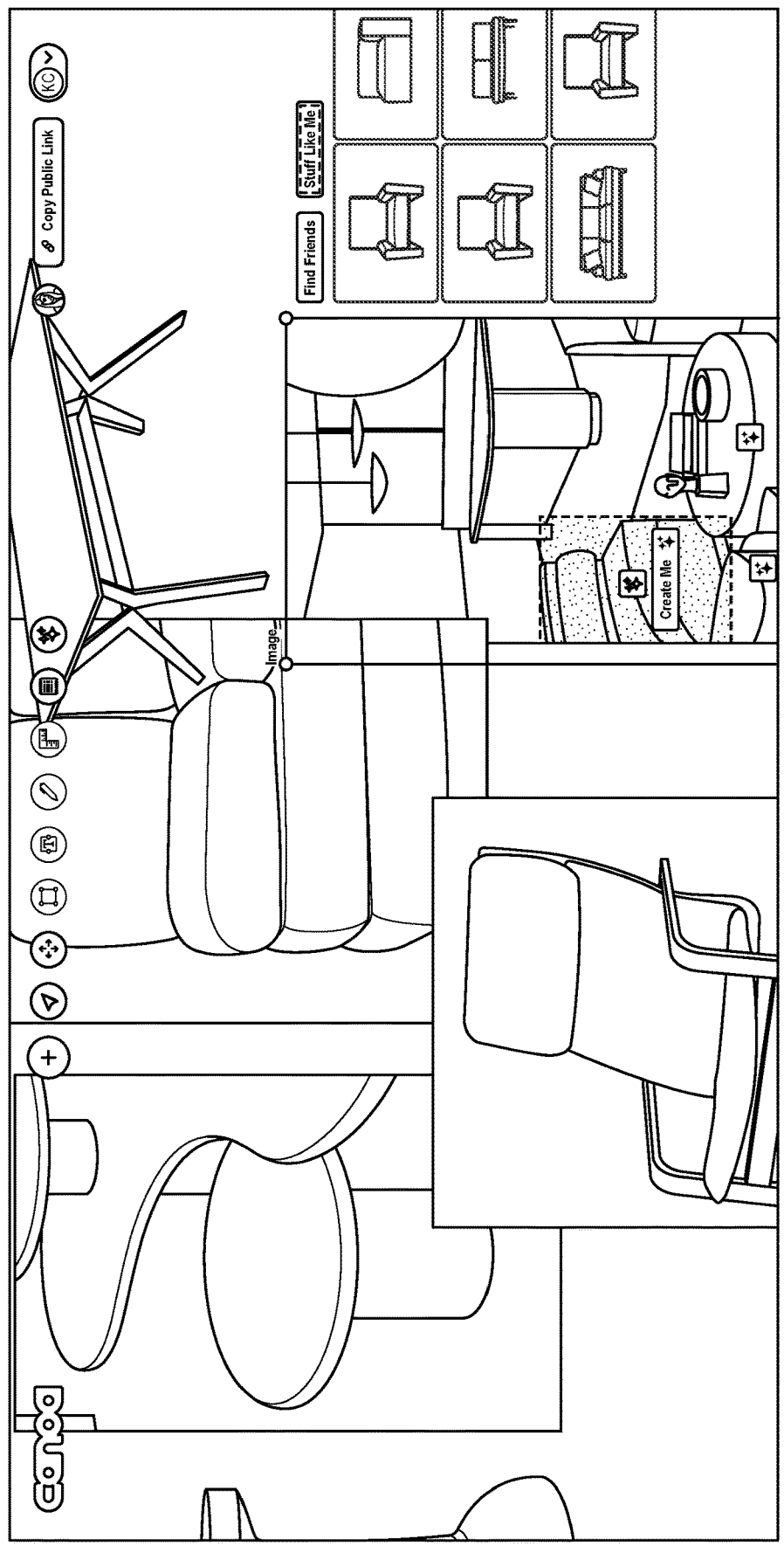
FIGS. 16-22 depict examples of user interfaces that a user may encounter in the context of the system described herein.

Next, at operation 1208, the object recommendation module 1200 generates an object recommendation based on object selection data, related design data, and the object design rule set. In some aspects, the object recommendation includes a replacement object recommendation (e.g., a seating object to replace a currently selected seating object). In other aspects, the object recommendation includes a recommendation for a coordinating object (e.g., a seating object for placement adjacent/with a desk or table object). For example, FIG. 16 depicts a user interface in which a user is selecting particular objects for CAD design purposes. As shown in FIG. 16, the system has generated one or more recommended replacement objects (e.g., chairs) for use in place of the currently selected object (e.g., chair). Conversely, in FIG. 17, the system has generated one or more recommendations of coordinating objects (e.g., additional chairs, side table, etc.) for use with the currently selected object (e.g., chair)

When generating the object recommendation, the system may, for example, process the object selection data, related design data, and the object design rule set using a rules-based model, a machine-learning model, or both to identify the set. For example, the rules-based model, machine learning model, or combination of both may be configured to process the object selection data, related design data, the object design rule set, and/or the like in generating a recommendation as to a coordinating object or a replacement object (e.g., replacement set of objects) for the replacement object (e.g., set of objects). For example, the rules-based model, machine learning model, or combination of both may be configured to generate recommendation based on the selected object that satisfies the object design rule set and considers the related design data. For example, the system may generate a recommendation based on past group purchases from other organizations that have utilized the selected object in a different CAD design, design ratings provided by system users, an internal set of design rules (e.g., directed toward texture requirements, color palate requirements, spend preferences, object impact preferences, etc.), physical item properties (e.g., chair height, etc.), and the like.

The system may then, according to particular aspects, use a rules-based model in generating a recommendation, such that the generated recommendation satisfies the set of rules (e.g., the object design rule set). The rules-based model may comprise a set of rules defined by the object design rule set. In some aspects, the set of rules may include one or more rules that a replacement object recommendation must share at least a particular number of properties with the selected object (e.g., at least a percentage of shared properties). For example, a replacement seating object may be required to have the same number of seating spaces (e.g., chair v. loveseat). In various aspects, the rules-based model may draw from a set of objects (e.g., as potential recommended objects) that is unique to a particular organization (e.g., available to or otherwise acquirable by the organization). In some aspects, the set of objects unique to a particular organization may be identified using any suitable technique described herein (e.g., any technique for identifying a user-specific set of objects). Accordingly, an organization (e.g., the CAD design and object acquisition and management computing system 100) may maintain the set of rules in some type of data storage, such as a database (e.g., the one or more data repositories 140), from which the CAD design and object acquisition and management computing system 100 can access the set of rules for selecting the set of objects for use in the CAD design. In other aspects, the system may generate a particular set of rules for each object (e.g., based on the object properties, etc.).

According to other aspects, the CAD design and object acquisition and management computing system 100 may utilize a machine learning model in generating a recommendation. Here, the machine learning model may be trained using historical data including prior objects selected to coordinate with the selected object, prior objects used to replace an object similar to the selected objects, etc. In some aspects, the system may provide an ultimate replacement or coordinating object selection as training data to the machine learning model. Accordingly, the machine learning model may be configured using a variety of different types of supervised or unsupervised trained models such as, for example, support vector machine, naive Bayes, decision tree, neural network, and/or the like.

According to still other aspects, the system may use a combination of the rules-based model and the machine learning model in generating a recommendation. In particular aspects, the system may generate a recommendation that includes a recommended replacement set of objects for a particularly selected set of objects. In some aspects, the generated recommendation may include an object kit, such as those described in the context of the object curation module 300.

For illustrative purposes, the object recommendation module 1200 is described with reference to implementations described above with respect to one or more examples described herein. Other implementations, however, are possible. In some aspects, the steps in FIG. 12 may be implemented in program code that is executed by one or more computing devices such as the CAD design and object acquisition and management computing system 100, the user device 120, or other system in FIG. 1. In some aspects, one or more operations shown in FIG. 12 may be omitted or performed in a different order. Similarly, additional operations not shown in FIG. 12 may be performed.

Initial Object Inventory Generation Module

Figure 13:
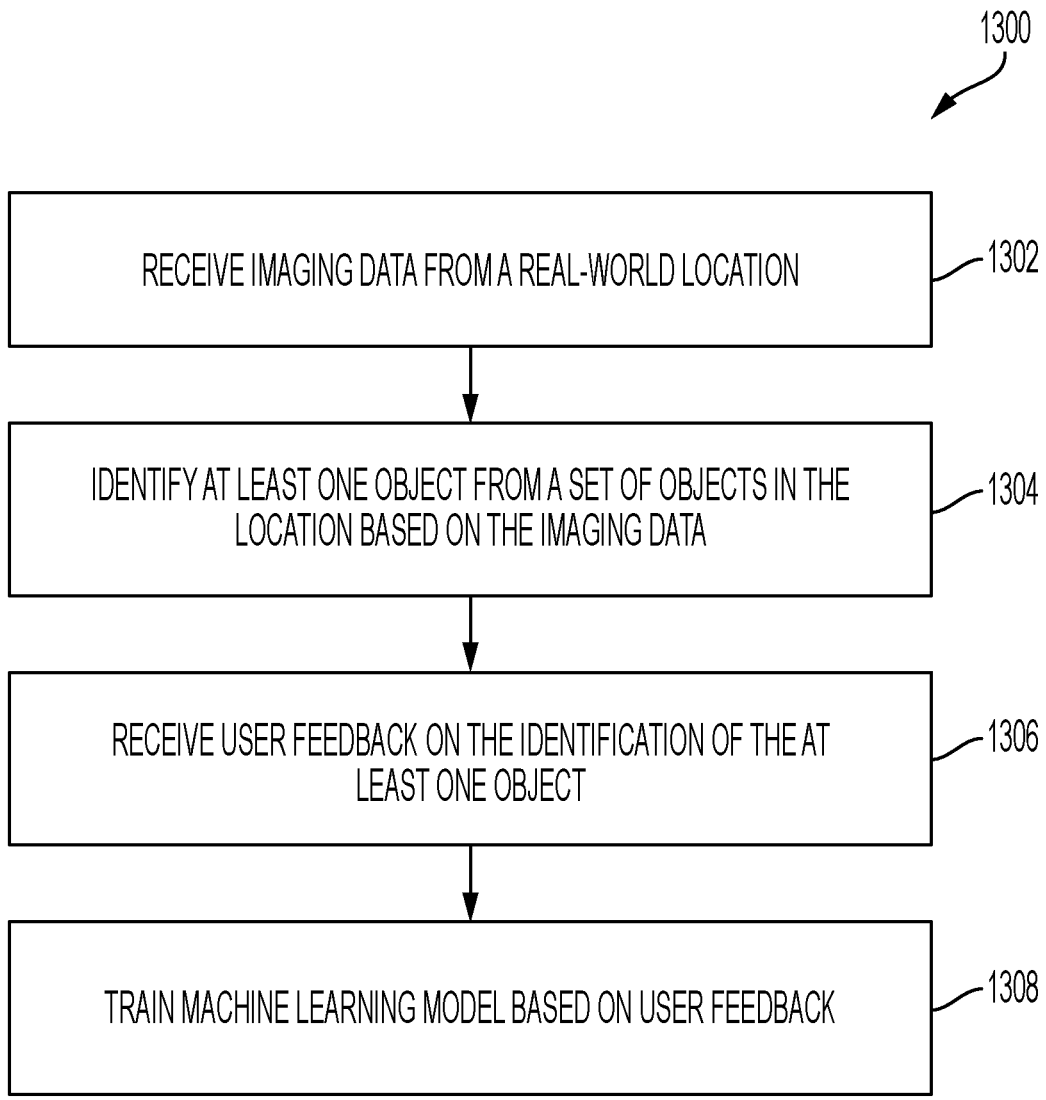
FIG. 13 depicts an example of a process for generating an initial inventory of objects in accordance with various aspects of the present disclosure.

Turning now to FIG. 13, additional details are provided regarding an initial object inventory generation module 1300 for generating an initial inventory of objects in accordance with various aspects of the present disclosure. In various aspects, the initial inventory may serve as an initial set of objects accessible to an organization for use in a CAD design as described herein (which may, for example, be supplemented by objects acquirable from other sources). For instance, the flow diagram shown in FIG. 13 may correspond to operations executed by computing hardware found in the CAD design and object acquisition and management computing system 100 as it executes the initial object inventory generation module 1300.

In some aspects, the initial object inventory generation module 1300 begins at operation 1302 by receiving imaging data from a real-world location. In some aspects, the imaging data may include one or more still images. In other aspects, the imaging data may include video data. In various aspects, the system may receive one or more sets of images of the same real-world location (e.g., from different angles, etc.).

At operation 1304, the initial object inventory generation module 1300 identifies at least one object from a set of objects in the location based on the imaging data. For example, the system may use one or more machine learning or artificial intelligence techniques to identify, within each image in the imaging data, at least one object (e.g., a set of objects) within each image. For example, the system may count each identifiable object within a space and generate a prediction as to a type of object and a particular prediction as to a particular object identified for each object.

For example, in particular embodiments the system identifies each object from the image data by classifying each object identified in each image. In some aspects, the system is configured to automatically identify each individual object within one or more images (e.g., by identifying an outline of the object within the image). In other embodiments, the system is configured to classify each object in response to selection, by a user, or each object within the image (e.g., by a user drawing a shape around the image that comprises the image within the shape, etc.). In some aspects, the initial object inventory generation module 1300 may use a classification machine-learning model on the image data to classify each identified object. In some aspects, the classification machine-learning model may generate a feature representation that includes components that represent different types of potential objects for each particular identified object. Each component provides a prediction (e.g., a prediction value) as to whether the object is a particular type of object, a particular model of object, etc. The classification machine-learning model may include multiple classifiers for the different types of objects that may be indexed by the system. For example, the classification machine-learning model may include classifiers for identifying objects such as: (1) object type; (2) object brand; (3) object color; (4) object model; (5) and/or the like. Therefore, the system may process each object identified in the imaging data using the classification machine-learning model in extracting classification data for the object.

Here, according to particular aspects, the classification model may comprise an ensemble of multiple classifiers. For instance, the classification model may include a classifier for each object category. For example, the classification model may include a first classifier for the category "object type," a second classifier for the category "model," a third classifier for the category "make," and so forth. The classification model may provide a data instance (e.g., different data elements that make up the data instance) from the data set as input to the classification model and the model may generate an output for the data instance that may comprise a representation (e.g., vector representation) that includes a component for each sub-category found in an object category providing the prediction (e.g., value) on the applicability of the sub-category to the data instance. Furthermore, the representation may provide a confidence (e.g., confidence value) for each prediction on the applicability of the corresponding sub-category of the bias category.

According to some aspects, the classifier may be a Bidirectional Encoder Representations from Transformers ("BERT") classifier. A fine-tuning process may be carried out for training the BERT classifier that involves using training data sets having attributes that recur across one or more industries to train the classifier for a corresponding classification task. The classification task could include classifying an object based on object data (e.g., image) as belonging to one or more of the different sub-categories found in a particular object category.

Additionally, or alternatively, the data instances may include media data such as images or video. The classification model can generate one or more embedded representations of the media data. For example, according to some aspects, a classification engine may process the media data (e.g., an image) using a convolutional neural network to generate the one or more embedded representations of the media data. Again, an embedded representation may comprise a vector representation of the media data having components with numerical values. The embedded representation may serve as one or more context information, characteristics, attributes, and/or the like of the media data. According to various aspects, the classification engine may perform other types of pre-processing to place the data instances in a more favorable format for classification analysis such as one-hot encoding to generate encoded representations of data, such as categorical data, and/or speech-totext to convert audio/video data into text data. According to some aspects, the classification engine may concatenate and/or merge the different representations of a data instance to form a combined representation of the data instance. The system may then determine a classification of a particular object using the classification analysis described above, or using any other suitable technique. In some aspects, the system may enable a user to provide feedback as to an accuracy of a particular classification, and provide the feedback as training data.

Continuing to operations 1306, the system receives user feedback on the identification of the at least one object. The system may, for example, present the imaging data to a user (e.g., on a suitable user interface) in conjunction with each generated prediction (e.g., by placing a prediction over each identified object, adjacent each identified object, etc.). The system may then provide one or more interface elements via which the user can provide data related to an accuracy of each prediction. For example, the user can confirm the prediction as accurate, provide the actual object data, correct an object type, correct a color, correct a condition, correct a model of the object, etc. In this way, the system may provide improvements to computing systems used for generating an initial object inventory by, for example, reducing cumbersome or time-consuming processes for identifying and inputting each different object type for each object within a particular space. Additional or alternative aspects reduce cumbersome, time-consuming processes for identifying each object, navigating to different platforms for entering data for each identified each object, accessing third party computing systems to determine model numbers and other data for each object, entering the data into a database of initial objects, etc. Such cumbersome processes require the use of arbitrary commands to access third party computing systems, enter consistent object data in consistent formats for potentially thousands or more objects, etc. In other aspects, the cumbersome processes may include identifying particular data sources that provide complete data for a particular object, navigating to those data sources on third party computing systems, and entering information into a first party computing system to record and populate an initial object inventory. These problems can be addressed by various user interface features described herein. For instance, a client application can include display elements that display classification predictions in conjunction with imaging data. A user can then quickly and easily review the predictions, making corrections as necessary.

In still other aspects, the system may identify the object as a known object for which the system has stored object details. In various aspects, in response to not identifying a particular object, the system is configured to enable a user to provide missing object details and stores those details in association with the newly identified object.

At operation 1308, the system trains a machine learning model (e.g., the classification-type machine learning model) based on the user feedback. The system may then provide the updated, trained model for use in future initial inventory generation. In some aspects, the system may identify that a particular object is not currently stored in an object inventory. The system may, in response, generate a new entry for the newly identified object, and store object details provided by the user.

Once each object in the imaging data has been identified, counted, etc., the system may generate an initial inventory that includes each identified object. In this way, the system may populate an initial inventory of objects for an organization (e.g., an initial inventory for at least a space represented within the imaging data). The system may then provide the initial inventory for an object management system (e.g., as described in the context of the object management module 600 herein).

For illustrative purposes, the initial object inventory generation module 1300 is described with reference to implementations described above with respect to one or more examples described herein. Other implementations, however, are possible. In some aspects, the steps in FIG. 13 may be implemented in program code that is executed by one or more computing devices such as the CAD design and object acquisition and management computing system 100, the user device 120, or other system in FIG. 1. In some aspects, one or more operations shown in FIG. 13 may be omitted or performed in a different order. Similarly, additional operations not shown in FIG. 13 may be performed.

User Experience

Figure 17:
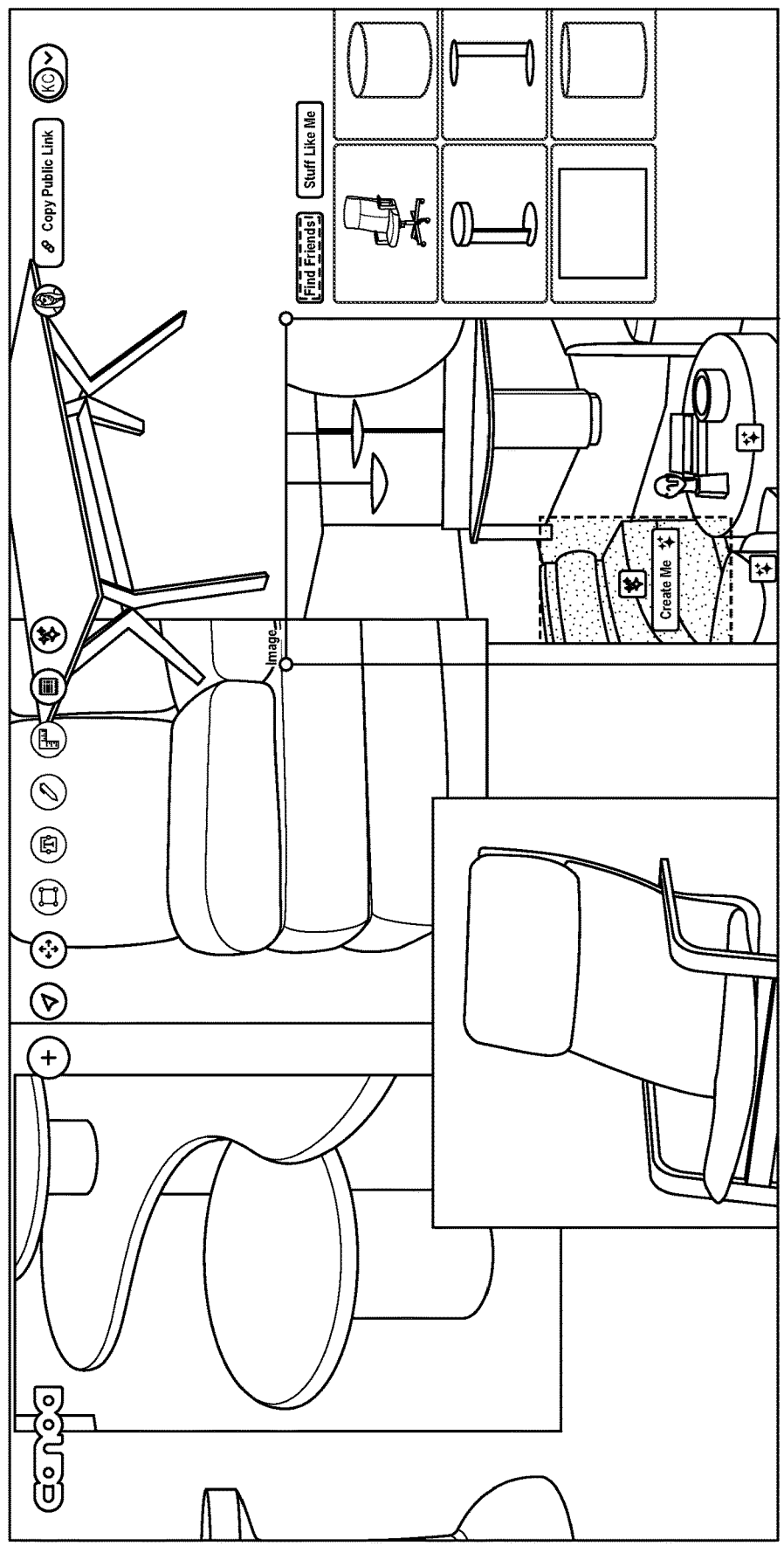
Figure 18:
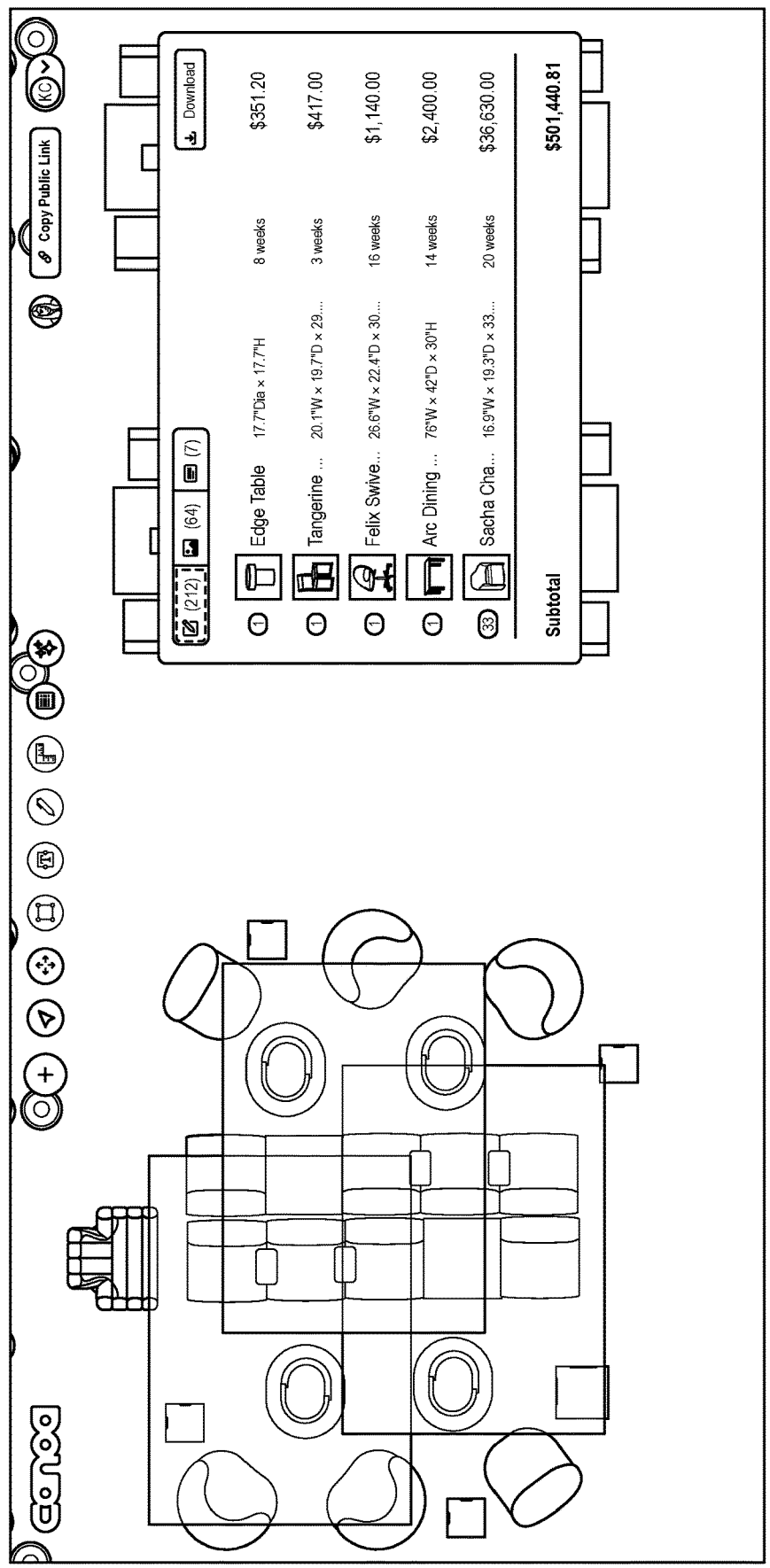

FIGS. 16-18 depict example user interfaces that a user may encounter when accessing certain features of the system described herein. For example, FIG. 16 depicts an image of a user interface in which a user is selecting an object and reviewing generated recommendations as to alternative selections which may be made in place of the selected object. As may be understood from this interface, the user has currently selected a chair object, and the system has generated a customized interface that includes several alternative chair objects. As described herein, when generating the recommendations, the system may have taken into account similar chair objects used in related designs, other objects that make up part of the design, object properties of the selected chair (e.g., height, moveability, presence of arm rests, location within the design, etc.) to provide recommendations that satisfy a set of rules or that follow one or more guidelines or past designs. In some aspects, the user can select an on-screen indicia in order to display the recommendations. In particular aspects, the recommendations are generated in response to selection of the indicia. In other aspects, pre-generated recommendations are accessed and displayed in response to the selection.

As described herein, certain user interfaces further provide improvements in graphics processing by automatically applying various rules of a particular type, such as to provide recommendations of suitable replacement objects, to control the manner in which computing devices dynamically generate a set of interface elements that include recommended replacement objects. Additionally, certain aspects automatically apply customized configurations to proposed objects for adding to the design environment. These rules can provide recommended objects that are more relevant to and specifically tailored to a particular user and/or organization. This process and these interfaces reduce or eliminate the need to rely on user inputs (e.g., scrolling through an endless list of potential replacement objects, etc.) to provide a subset of all available objects for placement in the design environment. The generation of such recommendations take into account the unique requirements, preferences, etc. of a particular user (e.g., which may include an individual user, a set of users that make up part of an organization, etc.) when generating and displaying user interfaces that include recommended replacement objects for consideration by a user of the system. These improved recommended replacement objects eliminate the inherent generic results of conventional searching systems or recommendation systems that simply enable sorting by single properties such as price, rating, etc. without consideration of the overall design of a virtual environment or the needs of the organization facilitating the design. In addition, using related design data to enhance these recommendations provides replacement object recommendations that are specific to a particular organization, such that the resulting generating user interfaces that includes these recommendations are entirely customized to a particular organization/user as the user interacts with the system. The automated application of these rules are facilitated by and specifically improve user interface generation for accessing functionality in a computer-aided design platform via user interfaces.

Similarly, FIG. 17 depicts an image of a user interface in which a user is selecting an object and reviewing generated recommendations as to coordinating selections which may be made in conjunction with the selected object. As may be understood in light of this disclosure, the system may also generate recommendations for additional objects for use in conjunction with/in addition to a currently selected object. In this way, the system may provide customized user interfaces that provide additional objects in a limited view that are selected based on recommendation generations made using any suitable technique described herein. Again, these improved interfaces enable a user to quickly view and access coordinating objects without scrolling through an endless list of available objects that may be unsuitable for use in the context of a current design.

FIG. 18 depicts a user interface that includes a set of objects in a particular orientation. As may be understood in light of this disclosure, a user may select the set of objects to coordinate with one another based on recommendations provided in the context of the current system. In some aspects, the system may further generate an arrangement of the objects (e.g., a recommendation of an arrangement) substantially automatically. For example, the system may utilize any technique described herein (e.g., such as in the context of the CAD design generation module 1100) and then provide the set of coordinated, arranged objects for placement within a virtual environment.

Figure 19:
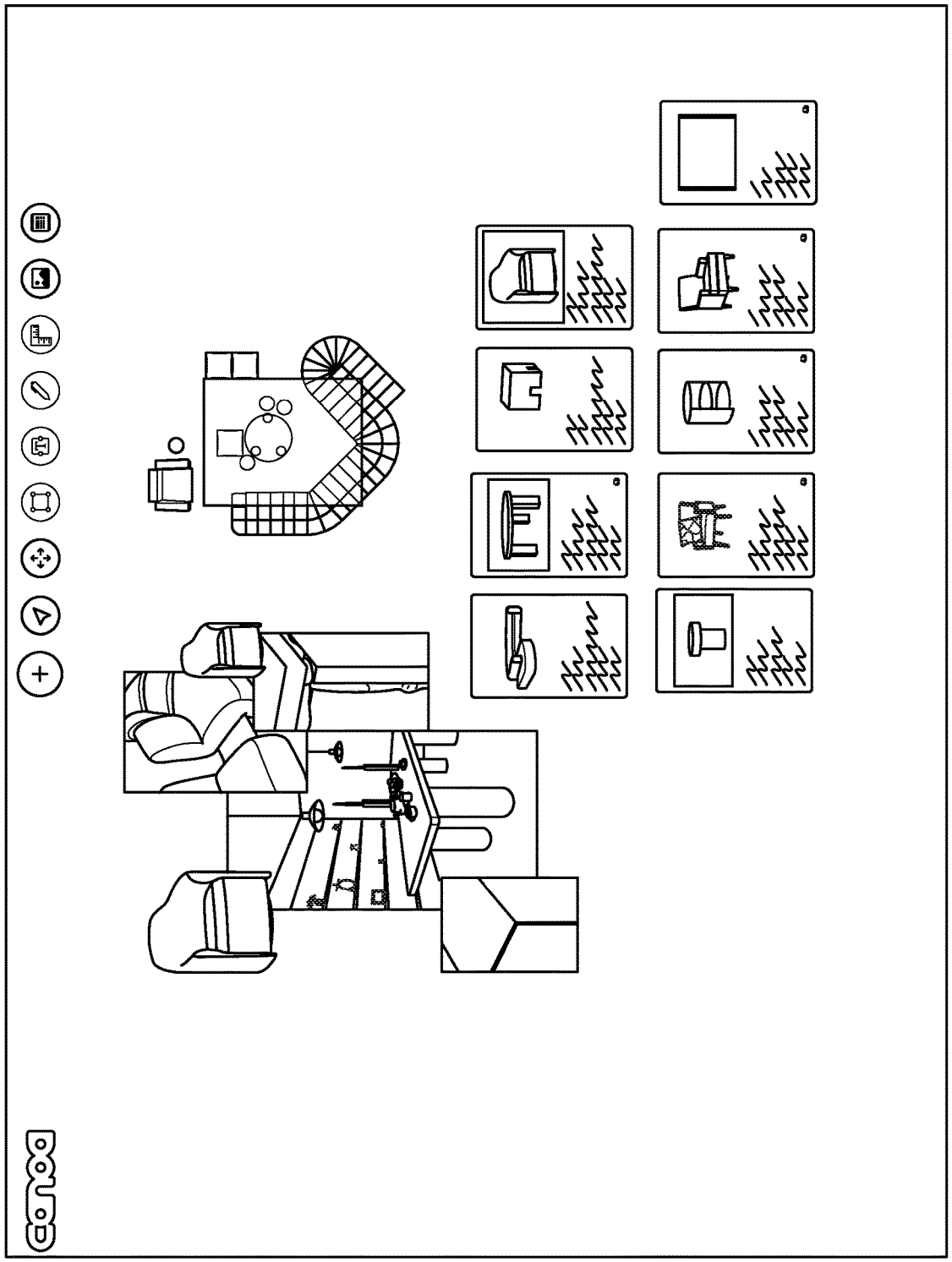

FIG. 19 depicts an exemplary design canvas interface that a user may encounter when accessing the design system. As may be understood from FIG. 19, the canvas enables a user to place images of objects and then generate a CAD design using objects from those images. For examples, the user may generate a 2D CAD design showing an overhead view of a space that includes a plurality of objects. Those objects may be displayed along with the design in both image form (e.g., using photographs) as well as detail images showing each object in addition to additional details for each object. In some aspects, the canvas may be unlimited (e.g., unbounded) dimensionally such that a single canvas may include a plurality of projects. In some aspects, the system is configured to enable a user to export a portion of a canvas (e.g., showing just a single design or design(s) for viewing or editing by a second user. In some aspects, the system is configured to enable multiple users to collaborate simultaneously in the same canvas.

Figure 20:
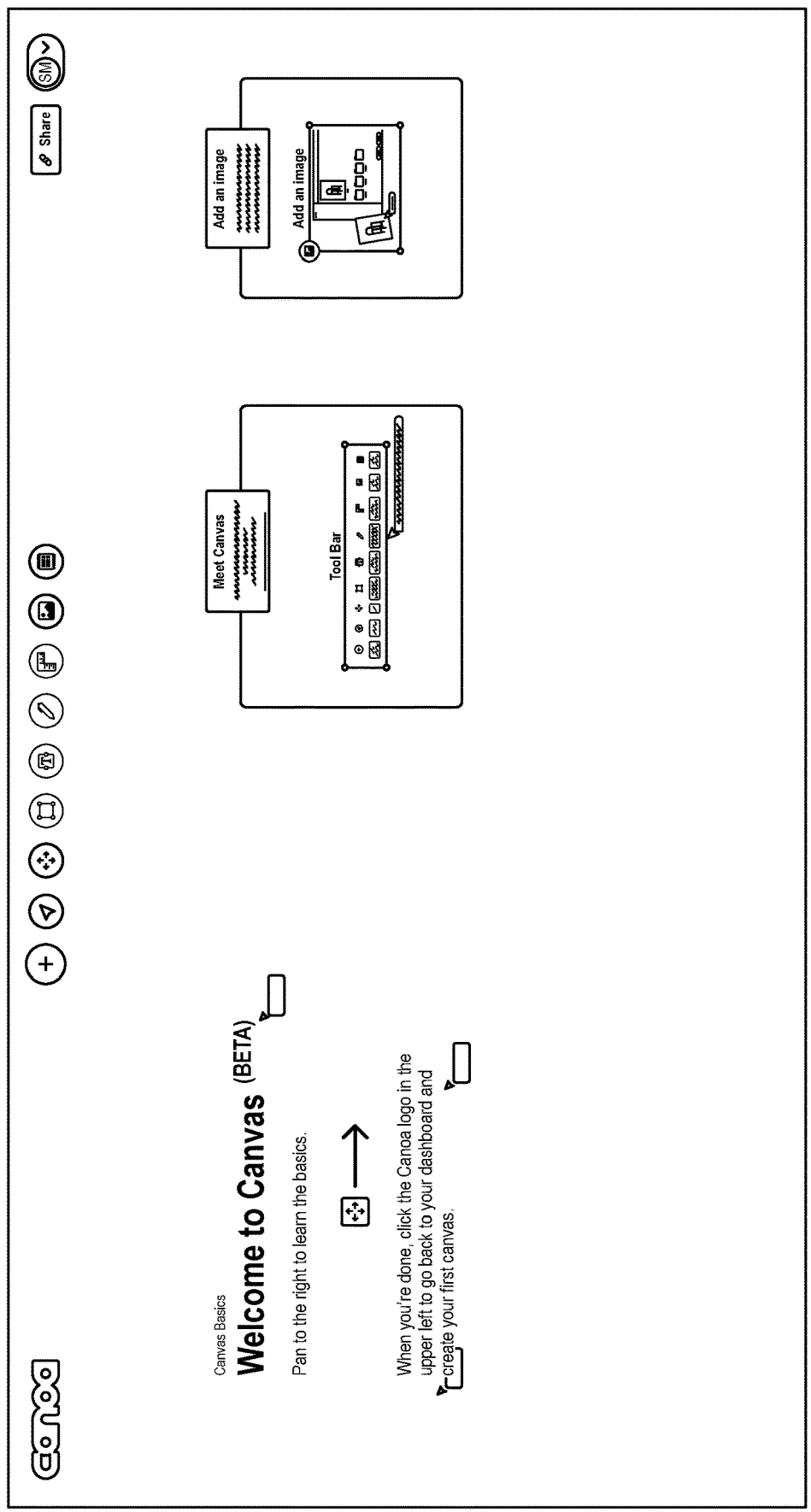
Figure 21:
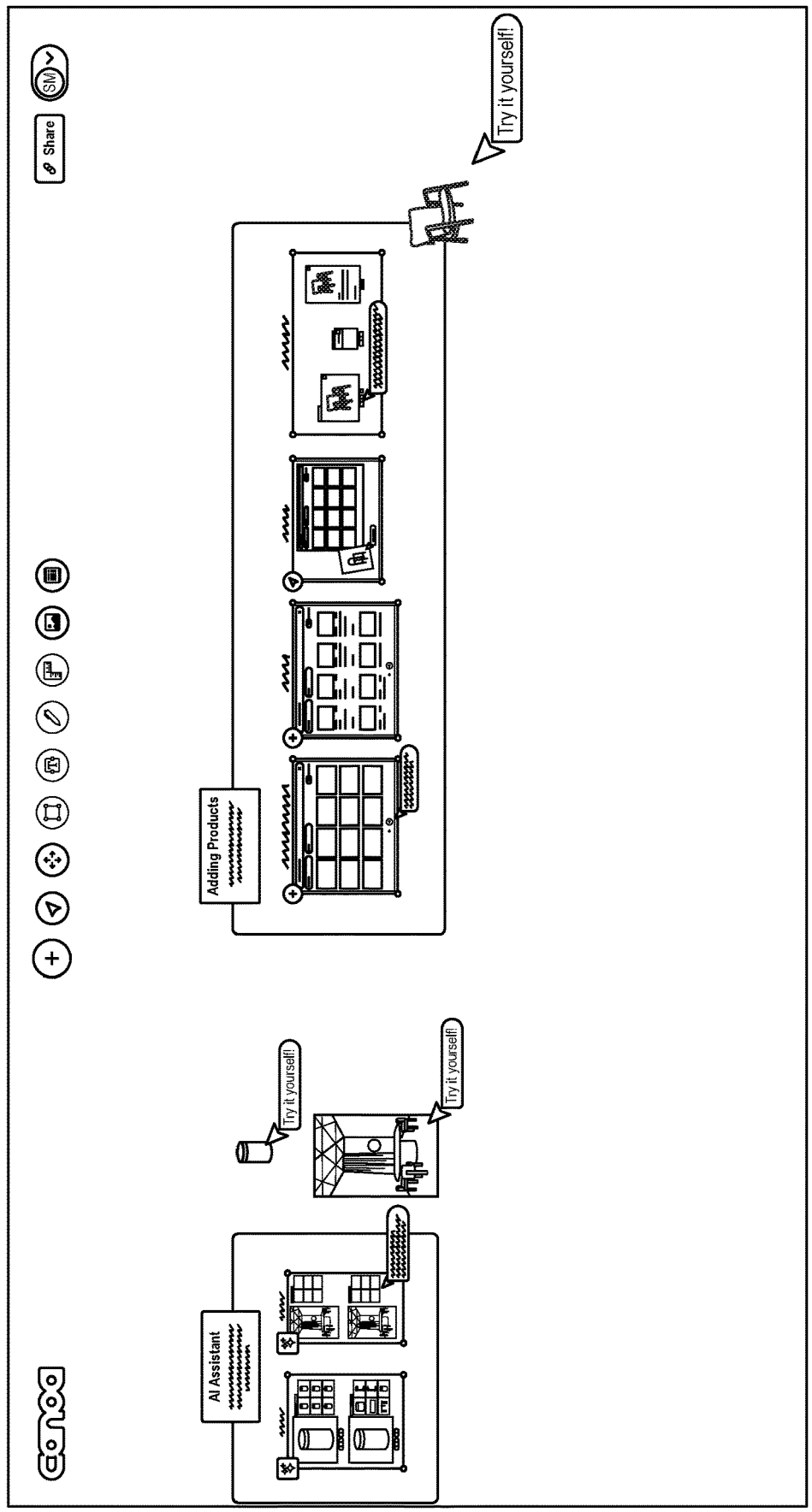
Figure 22:
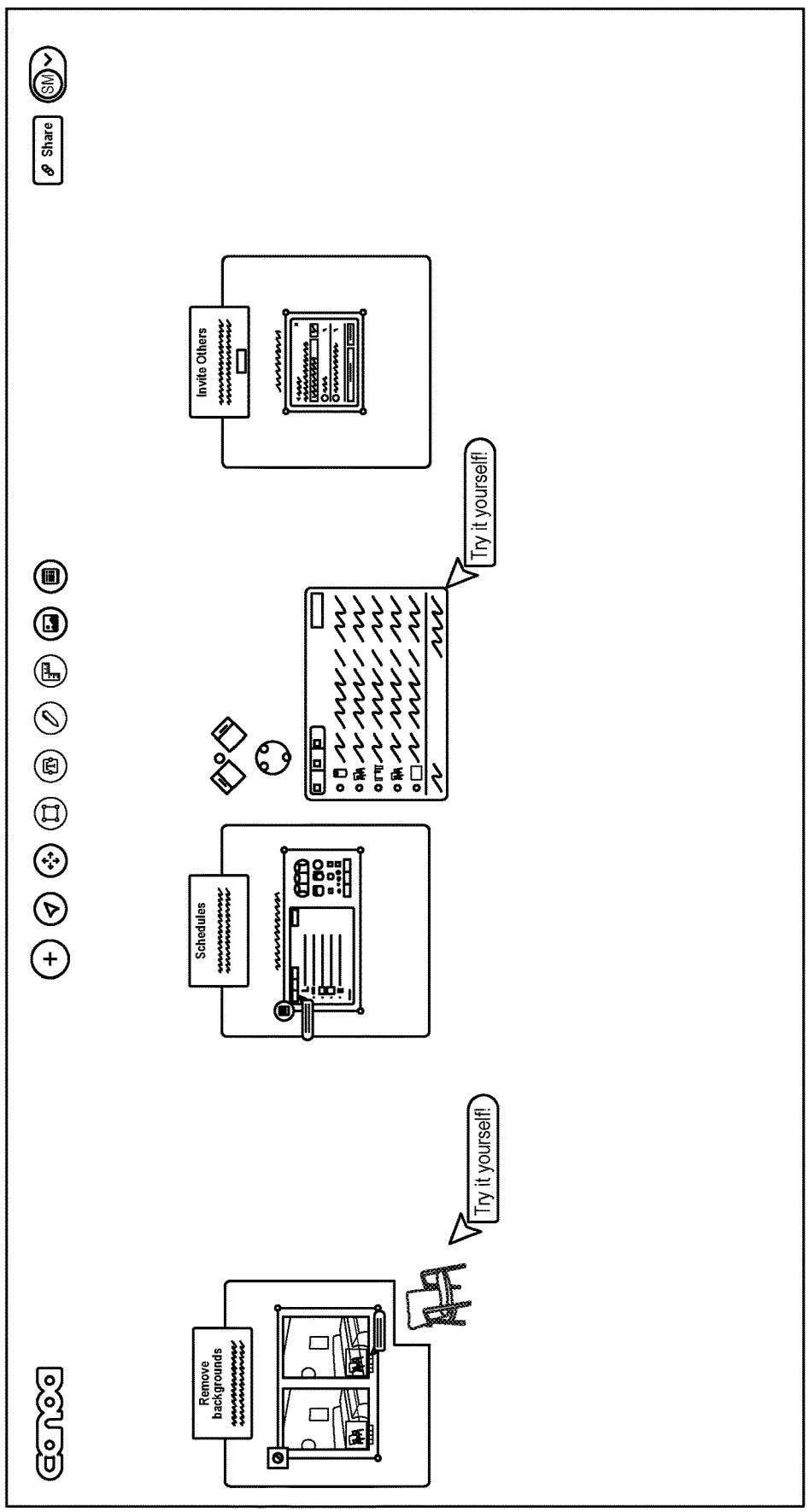

FIG. 20-22 depict platform features enabled in the CAD design interface and/or canvas. As may be understood from these figures, the design interface may enable a user to add images for analysis by the system (e.g., in order to generate recommendations for replacement objects or similar objects, in order to identify each object within the image, etc.). In other embodiments, the interface may provide interactive objects that enable a user to generate complementary object recommendations for new objects to utilize in a particular design. In particular embodiments, the system is configured to cut out identified objects from an image, so the user can use the object without the background to reduce crowding in a design. The system may then generate a schedule of each object utilized in the design, to display total cost, images, lead times, etc.

Various user interfaces depict exemplary design canvas interfaces. In the example shown in these image, the system may be configured to automatically count each object used in the design (e.g., using any suitable machine learning and/or artificial intelligence technique described herein) in order to generate an invoice and/or pricing schedule of all the objects (e.g., to be used in acquiring each object. As may be understood from this figure, in some aspects, the inspiration photos may have been analyzed by the system to identify and derive each individual object used in the design of a space. In this way, the system may, from a series of provided images, generate a set of recommended objects for use in a design (e.g., or extract actual object data to enable a user to design with objects identified from a photograph).

Example Technical Platforms

Aspects of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example aspects, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). A machine-readable storage medium or computer-readable storage medium may include a non-transitory medium in which data can be stored and that does not include carrier waves or transitory electronic signals.

In some aspects, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some aspects, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various aspects are described to use a computer-readable storage medium, other types of computer-readable storage media may be substituted for or used in addition to the computer-readable storage media described above.

Various aspects of the present disclosure may also be implemented as methods, apparatuses, systems, computing devices, computing entities, and/or the like. As such, various aspects of the present disclosure may take the form of a data structure, apparatus, system, computing device, computing entity, and/or the like executing instructions stored on a computer-readable storage medium to perform certain steps or operations. Thus, various aspects of the present disclosure also may take the form of entirely hardware, entirely computer program product, and/or a combination of computer program product and hardware performing certain steps or operations.

Various aspects of the present disclosure are described below with reference to block diagrams and flowchart illustrations. Thus, each block of the block diagrams and flowchart illustrations may be implemented in the form of a computer program product, an entirely hardware aspect, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some examples of aspects, retrieval, loading, and/or execution may be performed in parallel such that multiple instructions are retrieved, loaded, and/or executed together. Thus, such aspects can produce specially configured machines performing the steps or operations specified in the block diagrams and flowchart illustrations. Accordingly, the block diagrams and flowchart illustrations support various combinations of aspects for performing the specified instructions, operations, or steps.

Example System Architecture

Figure 14:
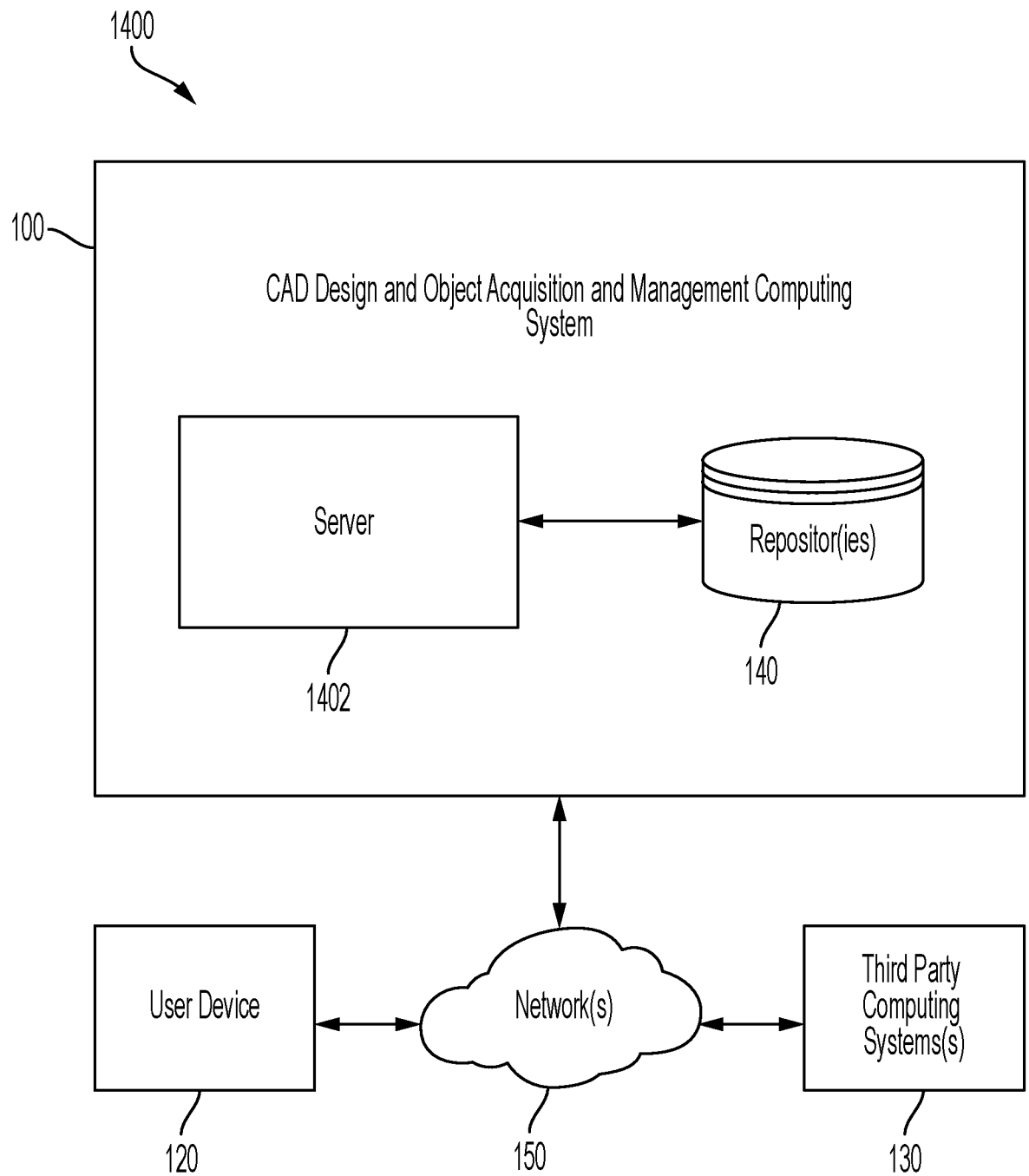
FIG. 14 depicts an example of a system architecture that may be used in accordance with various aspects of the present disclosure.

FIG. 14 is a block diagram of an example of a system architecture 1400 that can be for providing computer aided design platforms and object acquisition and management systems related to computer aided designs produced via such platforms as described herein. As may be understood from FIG. 1, the system architecture 1400 in some aspects may include a CAD design and object acquisition and management computing system 100 that comprises one or more servers 1402 and a data repository 140. The data repository 140 may be made up of computing components such as servers, routers, data storage, networks, and/or the like that are used on the CAD design and object acquisition and management computing system 100 to store and manage object data, order data, object inventory data and other data described herein.

As previously noted, the CAD design and object acquisition and management computing system 100 may provide a CAD and e-commerce platform to various entities that is available over one or more networks 150. Here, an entity may access the service via a user device 120 associated with an organization. For example, the CAD design and object acquisition and management computing system 100 may provide the service through a website that is accessible to the user device 120 the one or more networks 150.

According, the server(s) 1402 may execute the CAD module 200, object curation module 300, object impact determination module 400, object ingestion module 500, object management module 600, and object acquisition module 700 as described herein. Further, according to particular aspects, the server(s) 1402 may provide one or more graphical user interfaces (e.g., one or more webpages, webform, and/or the like through the website) through which users can interact with the CAD design and object acquisition and management computing system 100. Furthermore, the server(s) 1402 may provide one or more interfaces that allow the CAD design and object acquisition and management computing system 100 to communicate with third-party computing system(s) 130 such as one or more suitable application programming interfaces (APIs), direct connections, and/or the like.

Example Computing Hardware

Figure 15:
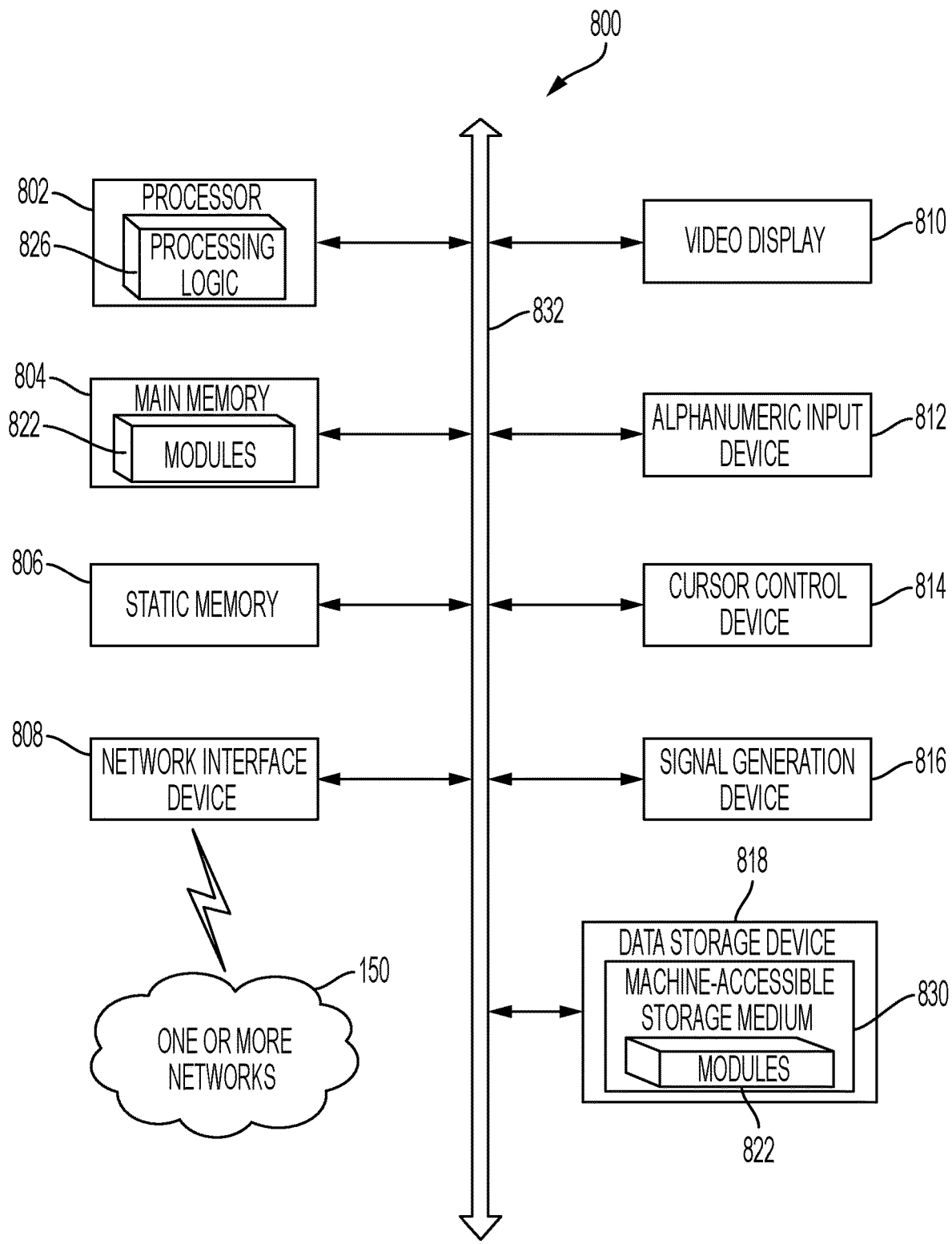
FIG. 15 depicts an example of a computing entity that may be used in accordance with various aspects of the present disclosure.

FIG. 15 illustrates a diagrammatic representation of a computing hardware device 800 that may be used in accordance with various aspects. For example, the hardware device 800 may be computing hardware such as a server 1402 as described in FIG. 14. According to particular aspects, the hardware device 800 may be connected (e.g., networked) to one or more other computing entities, storage devices, and/or the like via one or more networks such as, for example, a LAN, an intranet, an extranet, and/or the Internet. As noted above, the hardware device 800 may operate in the capacity of a server and/or a client device in a client-server network environment, or as a peer computing device in a peer-to-peer (or distributed) network environment. In some aspects, the hardware device 800 may be a personal computer (PC), a tablet PC, a set-top box (STB), a Personal Digital Assistant (PDA), a mobile device (smartphone), a web appliance, a server, a network router, a switch or bridge, or any other device capable of executing a set of instructions (sequential or otherwise) that specify actions to be taken by that device. Further, while only a single hardware device 800 is illustrated, the term "hardware device," "computing hardware," and/or the like shall also be taken to include any collection of computing entities that individually or jointly execute a set (or multiple sets) of instructions to perform any one or more of the methodologies discussed herein.

A hardware device 800 includes a processor 802, a main memory 804 (e.g., read-only memory (ROM), flash memory, dynamic random-access memory (DRAM) such as synchronous DRAM (SDRAM), Rambus DRAM (RDRAM), and/or the like), a static memory 806 (e.g., flash memory, static random-access memory (SRAM), and/or the like), and a data storage device 818, that communicate with each other via a bus 832.

The processor 802 may represent one or more general-purpose processing devices such as a microprocessor, a central processing unit, and/or the like. According to some aspects, the processor 802 may be a complex instruction set computing (CISC) microprocessor, reduced instruction set computing (RISC) microprocessor, very long instruction word (VLIW) microprocessor, a processor implementing other instruction sets, processors implementing a combination of instruction sets, and/or the like. According to some aspects, the processor 802 may be one or more special-purpose processing devices such as an application specific integrated circuit (ASIC), a field programmable gate array (FPGA), a digital signal processor (DSP), network processor, and/or the like. The processor 802 can execute processing logic 826 for performing various operations and/or steps described herein.

The hardware device 800 may further include a network interface device 808, as well as a video display unit 810 (e.g., a liquid crystal display (LCD), a cathode ray tube (CRT), and/or the like), an alphanumeric input device 812 (e.g., a keyboard), a cursor control device 814 (e.g., a mouse, a trackpad), and/or a signal generation device 816 (e.g., a speaker). The hardware device 800 may further include a data storage device 818. The data storage device 818 may include a non-transitory computer-readable storage medium 830 (also known as a non-transitory computer-readable storage medium or a non-transitory computer-readable medium) on which is stored one or more modules 822 (e.g., sets of software instructions) embodying any one or more of the methodologies or functions described herein. For instance, according to particular aspects, the modules 822 include a CAD module 200, object curation module 300, object impact determination module 400, object ingestion module 500, object management module 600, and object acquisition module 700 as described herein. The one or more modules 822 may also reside, completely or at least partially, within main memory 804 and/or within the processor 802 during execution thereof by the hardware device 800—main memory 804 and processor 802 also constituting computer-accessible storage media. The one or more modules 822 may further be transmitted or received over a network 150 via the network interface device 808.

While the computer-readable storage medium 830 is shown to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding, and/or carrying a set of instructions for execution by the hardware device 800 and that causes the hardware device 800 to perform any one or more of the methodologies of the present disclosure. The term "computer-readable storage medium" should accordingly be understood to include, but not be limited to, solid-state memories, optical and magnetic media, and/or the like.

System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, steps, structural devices, acts, or modules. These states, operations, steps, structural devices, acts, and modules may be implemented in software, in firmware, in special purpose digital logic, and any combination thereof. Greater or fewer operations may be performed than shown in the figures and described herein. These operations also may be performed in a different order than those described herein.

CONCLUSION

While this specification contains many specific aspect details, these should not be construed as limitations on the scope of any invention or of what may be claimed, but rather as descriptions of features that may be specific to particular aspects of particular inventions. Certain features that are described in this specification in the context of separate aspects also may be implemented in combination in a single aspect. Conversely, various features that are described in the context of a single aspect also may be implemented in multiple aspects separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Additionally, while some examples of a two-dimensional CAD environment are described, it should be understood that in other aspects, the system may be implemented with a three-dimensional CAD environment, two-dimensional CAD environment, or both.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various aspects described above should not be understood as requiring such separation in all aspects, and the described program components (e.g., modules) and systems may be integrated together in a single software product or packaged into multiple software products.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for the purposes of limitation.

What is claimed:

1. A method comprising:
   generating, by computing hardware, a graphical user interface comprising a virtual environment;
   providing, by the computing hardware, the graphical user interface for display on a computing device;
   accessing, by the computing hardware, user data for a user of the computing device;
   generating, by the computing hardware based on the user data, a user-specific customized set of objects by:
      interfacing with a plurality of third party computing systems to identify a first set of acquirable objects, each object in the first set of acquirable objects being available via a respective third party computing system of the plurality of third party computing systems;
      identifying a second set of available objects based on the user data, the second set of available objects corresponding to a set of objects that are currently available to the user; and
      generating the user-specific customized set of objects to include at least the first set of acquirable objects and the second set of acquirable objects;
   providing, by the computing hardware, the user-specific customized set of objects for placement and positioning within the virtual environment;
   receiving, by the computing hardware, a selection of a particular object in the user-specific customized set of objects;
   responsive to receiving the selection of the particular object:
      accessing a set of object properties for the particular object;
      analyzing object selection data, the object selection data indicating a set of currently placed objects from the user-specific customized set of objects that are currently placed within the virtual environment;
      analyzing related design data, the related design data comprising a set of design data for a set of other virtual environments, wherein at least a portion of the other virtual environments in the set of other virtual environments include the particular object;
      accessing an object design ruleset, the object design ruleset defining one or more selection limitations;
      processing the set of object properties, the object selection data, the related design data, and the object design ruleset using at least one of a rules-based model or a machine-learning model to generate an object recommendation; and
      modifying, by the computing hardware, the graphical user interface to include an indication of the object recommendation.

2. The method of claim 1, wherein the object recommendation comprises at least one of:
   a first recommendation for a replacement object to replace the particular object; or
   a second recommendation for a complimentary object for placement in proximity with the particular object.

3. The method of claim 1, wherein the set of object properties comprise at least one of an object type of the particular object;
   an object size of the particular object;
   an object color of the particular object;
   an object condition of the particular object; or
   a set of object features for the particular object.

4. The method of claim 1, wherein the object design ruleset defines at least one of:
   one or more object impact rules;
   one or more object cost rules;
   one or more object rating rules;
   one or more object relational rules; or
   one or more shared property limitation rules.

5. The method of claim 4, wherein processing the set of object properties, the object selection data, the related design data, and the object design ruleset using the at least one of the rules-based model or the machine-learning model to generate the object recommendation comprises processing the set of object properties, the object selection data, the related design data, and the object design ruleset using the rules-based model to generate the object recommendation such that the rules-based models assigns a weighting to each rule in the object design ruleset such that the object recommendation violates at least one rule in the object design ruleset.

6. The method of claim 1, further comprising:
   accessing, by the computing hardware for the particular object:
      object characteristic data; and
      object lifecycle data;
   processing the object characteristic data and the object lifecycle data using at least one of a machine learning model or a rules-based model to generate object impact data for the particular object;
   determining, based on the object impact data, an impact value for the particular object; and
   modifying the graphical user interface to include an indication of the impact value.

7. The method of claim 1, further comprising:
   receiving, by the computing hardware, an acquisition request for a subset of the user-specific customized set of objects;
   identifying, by the computing hardware, for each respective object from the subset of user-specific customized set of objects, at least one of:
      the respective third party computing system; or
      logistical operations specific to the respective object; and
   responsive to the acquisition request, performing, by the computing hardware for each respective object from the subset of user-specific customized set of objects, at least one of:
      initiating network communication with the respective third party computing system; or
      initiating the logistical operations specific to the respective object.

8. A non-transitory computer-readable medium having program code that is stored thereon, the program code executable by one or more processing devices for performing operations comprising:
  generating a graphical user interface comprising a virtual environment;
  providing the graphical user interface for display on a computing device;
  generating a user-specific customized set of objects by interfacing with a plurality of third party computing systems to identify a set of acquirable objects, each object in the set of acquirable objects being available via a respective third party computing system of the plurality of third party computing systems;
  providing the user-specific customized set of objects for placement and positioning within the virtual environment;
  receiving from a user via the computing device, selection of a subset of the user-specific customized set of objects for placement and positioning within the virtual environment;
  modifying the virtual environment to include each respective object from the user-specific customized set of objects such that each respective object is placed and positioned based on input from the user;
  receiving a selection of a particular object in the user-specific customized set of objects;
  responsive to receiving the selection of the particular object:
    accessing a set of object properties for the particular object;
    analyzing object selection data, the object selection data indicating a set of currently placed objects from the user-specific customized set of objects that are currently placed within the virtual environment;
    processing the set of object properties and the object selection data using at least one of a rules-based model or a machine-learning model to generate an object recommendation; and
    modifying, by the computing hardware, the graphical user interface to include an indication of the object recommendation.

9. The non-transitory computer readable medium of claim 8, wherein the set of object properties comprise at least one of:
  an object type of the particular object;
  an object size of the particular object;
  an object color of the particular object;
  an object condition of the particular object; or
  a set of object features for the particular object.

10. The non-transitory computer readable medium of claim 8, wherein processing the set of object properties and the object selection data using the at least one of the rules-based model or the machine-learning model to generate the object recommendation comprises processing the set of object properties and the object selection data using the at least one of the rules-based model or the machine-learning model to generate an object recommendation from the user-specific customized set of objects.

11. The non-transitory computer-readable medium of claim 8, wherein:
  the object recommendation comprises a complete object set recommendation for each respective object in the subset of the user-specific customized set of objects for placement and positioning within the virtual environment; and
  the operations further comprise:
    receiving space planning data;
    determining object preference data;
    processing the set of object properties, the object selection, the space planning data, and the object preference data using at least one of a rules-based model or a machine-learning model to generate the complete object set recommendation.

12. The non-transitory computer readable medium of claim 11, the operations further comprising:
  automatically populating the virtual environment with the subset of the user-specific customized set of objects provided by the complete object set recommendation by:
    processing the subset of the user-specific customized set of objects provided by the complete object set recommendation using at least one of a rules-based model or a machine-learning model to determine a position and orientation of each object in the subset of the user-specific customized set of objects; and
    placing each object in the subset of the user-specific customized set of objects in the virtual environment according to the determined position and orientation.

13. The non-transitory computer-readable medium of claim 8, wherein:
  the particular object is in the subset of the user-specific customized set of objects;
  the operations further comprise:
    receiving a request to replace the particular object with a replacement object according to the object recommendation;
    responsive to the request, modifying the subset of the user-specific customized set of objects to include the replacement object and exclude the particular object.

14. The non-transitory computer-readable medium of claim 8, the operations further comprising:
  receiving an acquisition request for the subset of the user-specific customized set of objects;
  identifying, for each respective object from the subset of user-specific customized set of object, the respective third party computing system; and
  responsive to the acquisition request, facilitating communication with each respective third party computing system.

15. A system comprising:
  a non-transitory computer-readable medium storing instructions; and
  a processing device communicatively coupled to the non-transitory computer-readable medium, wherein the processing device is configured to execute the instructions and thereby perform operations comprising:
  generating a graphical user interface comprising an environment layout;
  accessing, for a particular user, a set of available objects for use in the environment layout;
  providing the graphical user interface for a computing device of the particular user;
  providing, via the graphical user interface, the set of available objects for placement in the environment layout;
  receiving a selection of a particular object in the set of available objects;
  responsive to receiving the selection of the particular object:
    accessing a set of object properties for the particular object;

analyzing object selection data, the object selection data indicating a set of currently placed objects from set of available objects that are currently placed within the virtual environment;

analyzing related design data, the related design data comprising a set of design data for a set of other virtual environments, wherein at least a portion of the other virtual environments in the set of other virtual environments include the particular object;

accessing an object design ruleset, the object design ruleset defining one or more selection limitations;

processing the set of object properties, the object selection data, the related design data, and the object design ruleset using at least one of a rules-based model or a machine-learning model to generate an object recommendation; and modifying, by the computing hardware, the graphical user interface to include an indication of the object recommendation.

16. The system of claim 15, wherein:
the set of object properties comprise at least one of:
  an object type of the particular object;
  an object size of the particular object;
  an object color of the particular object; or
  an object feature of the particular object; and
the object design ruleset defines at least one of:
  one or more object impact rules;
  one or more object cost rules; or
  one or more object rating rules.

17. The system of claim 15, wherein:
the object recommendation comprises a set of potential replacement objects for the particular object;
the operations further comprise:
  accessing, for each potential replacement object in the set of potential replacement objects:
    respective object characteristic data; and
    respective object lifecycle data;
  processing the respective object characteristic data and the respective object lifecycle data using at least one of a machine learning model or a rules-based model to generate respective object impact data for each potential replacement object;

determining, based on the respective object impact data, a respective impact value for each potential replacement object; and modifying the graphical user interface to include an indication of the respective impact value in association with each potential replacement object in the set of potential replacement objects.

18. The system of claim 15, wherein:
the object recommendation comprises a set of potential replacement objects for the particular object;
the set of object properties comprise at least three of:
  an object type of the particular object;
  an object size of the particular object;
  an object color of the particular object; or
  an object feature of the particular object; and
the object design ruleset defines a requirement that each potential replacement object in the set of potential replacement objects share at least three object properties with the particular object.

19. The system of claim 15, the operations further comprising:
  receiving, within the virtual environment, image data for a new object;
  processing, by the computing hardware, the image data using a classification model to determine a classification for the new object;
  processing the classification for the new object using at least one of a rules-based model or a machine-learning model to generate a second object recommendation for the new object from the set of available objects.

20. The system of claim 15, the operations further comprising:
  receiving a request to initiate acquisition of the first portion of the set of available objects;
  identifying a set of respective sources for the first portion of the set of available objects; and
  in response to the request, initiating network communication with or processing operations on a plurality of third party computing systems to facilitate the acquisition, each of the plurality of third party computing systems being associated with a respective source of the set of respective sources.

* * * * *